United States Patent [19]

Scarola et al.

[11] Patent Number: 5,291,190
[45] Date of Patent: Mar. 1, 1994

[54] OPERATOR INTERFACE FOR PLANT COMPONENT CONTROL SYSTEM

[75] Inventors: Kenneth Scarola, Windsor; Robert L. Rescorl, Vernon, both of Conn.

[73] Assignee: Combustion Engineering, Inc., Windsor, Conn.

[21] Appl. No.: 676,795

[22] Filed: Mar. 28, 1991

[51] Int. Cl.[5] .............................. H04Q 1/00
[52] U.S. Cl. ..................... 340/825.06; 364/138; 364/154; 364/190; 376/216
[58] Field of Search .............. 340/825.06; 364/138, 364/146, 154, 181, 188, 189, 190; 376/215, 216

[56] References Cited

U.S. PATENT DOCUMENTS

| 4,853,175 | 8/1989 | Book, Sr. ...................... 376/216 |
| 4,902,469 | 2/1990 | Watson et al. . |
| 4,942,514 | 7/1990 | Miyagaki et al. . |
| 5,006,976 | 4/1991 | Jundt ............................ 364/184 |
| 5,121,318 | 6/1992 | Lipner et al. ................. 364/146 |

FOREIGN PATENT DOCUMENTS 115178A 12/1983 European Pat. Off. .
204260A 5/1986 European Pat. Off. .
2181274A 8/1986 United Kingdom .

Primary Examiner—Donald J. Yusko
Assistant Examiner—Brian Zimmerman
Attorney, Agent, or Firm—Chilton, Alix & Van Kirk

[57] ABSTRACT

The invention provides integration of the automatic semiautomatic and manual modes on a single man-machine interface device (200,400), with the master control of a system parameter such as pressurizer level, which is responsive to at least two system components (charging pumps, letdown valves), each of which can adjust a different system variable. The setpoint for automatic master control, is selected and displayed (216) on the device, along with the current value (212) of the setpoint parameter (pressurizer level). In the semiautomatic master mode selectable by the operator on the device, either a setpoint (272) or an output demand (282) can be specified for one of the components (206), and the master controller will then adjust the other component (204) accordingly. When all subgroup controls are in the manual mode, the master controller is completely overridden by operator control of each component or subgroup.

26 Claims, 22 Drawing Sheets

Fig.2 COMPONENT CONTROL SYSTEMS
FUNCTIONAL BLOCK DIAGRAM

Fig. 3 COMPONENT CONTROL SYSTEM
DIVISION BLOCK DIAGRAM

COMPONENT CONTROL SYSTEM APPLICATION SOFTWARE DISTRIBUTION

Fig. 5 SYS80+PROCESS-CCS SYSTEM FUNCTIONAL ASSIGNMENTS

Fig. 6 SYS80+PROCESS-CCS
PLANT COMPONENT FUNCTIONAL GROUPING

OPERATOR INTERFACE FOR PLANT COMPONENT CONTROL SYSTEM

The present invention relates to process plant control, and more particularly, to the man-machine interface for the control of a process in a nuclear power plant.

BACKGROUND OF THE INVENTION

The control of a complex industrial process, such as a chemical refinery or central electric power generating station, is a complex endeavor which places high demands for information processing on equipment and operators. Particularly with respect to nuclear power plants, the control of the plant and its processes must not only satisfy objectives arising from economic optimization, but also must satisfy safety objectives more stringent than those faced by virtually any other industry.

In the nuclear power industry, recent developments in instrumentation and control engineering have been directed toward the integration and presentation of information to the operator in the plant central control room, in a manner that gives the operator a higher level of understanding of the condition of the plant or of particular systems and processes. Particularly under the stress of an abnormal plant occurrence, it is not an easy task for the operator to infer the nature of the problem and decide upon the most appropriate mitigating action, in response to stimulus overload from alarms and other displays concerning individual parameters and individual components.

Considerable progress has been made with respect to integrating parameter and component signals into more useful indicator and monitor displays for the operator, as described, for example, in International Pat. application Ser. No. PCT/US89/04899 filed Nov. 2, 1989 for "Advanced Nuclear Plant Control Complex", the disclosure of which is hereby incorporated by reference. Despite improvements in monitoring and display, the development of an easy-to-use, integrated controller interface has not kept pace. In particular, although the operator has available to him improved indicators, alarms, and other monitoring interfaces, the manner in which the operator must divide his attention between the control panel, at which action is taken to actuate components and the indicator panel, where the results of control action are observed, has not improved commensurately.

One example of a process controller representing the recent state of the art, is shown in FIG. 1, which depicts a man-machine interface for the process control associated with the operation of the pressurizer system in a pressurized water nuclear power plant. The interface is premised on the understanding that the behavior of the pressurizer system can be influenced by controlling either on pressure in the pressurizer, or by the liquid level in the pressurizer. Thus, pressure control, level control, and the signal inputs for the system are controlled from the common man-machine interface device shown in FIG. 1.

The pressure and level control functionality associated with the device of FIG. 1, are each a master controller that sends signals to subgroup controls. For example, the pressurizer level controller controls level by sending signals to one or both of the charging pumps and letdown valves. Such action also affects the pressure in the pressurizer. If, however, the operator wants to control the charging pumps or letdown valves individually, the necessary controls are located on a different man-machine interface device. Looked at more generally, the prior art as represented by FIG. 1, provides a process controller device by which the operator can establish a setpoint or specify a demand for one or more process parameters in a given system. If the parameter is responsive to the operation of only one component, then control of such parameter is tantamount to the control of the component. Where, however, a plurality of components are available to adjust the parameter, the process controller acts as a master controller over this subgroup of components, but the operator cannot adjust the subgroup components individually, without going to a separate control device.

SUMMARY OF THE INVENTION

It is thus an object of the present invention to provide greater integration between the process control in a system and the control of individual components and component subgroups of that system.

It is a more particular object of the invention to place subgroup controls on the same process controller device that performs the master controller function for the process.

Accomplishing these objectives in accordance with the present invention improves the operator's ability to make the transitions between true master control at a relatively high functional level of the system (e.g., pressurizer level), and individual support processes for subgroup control (e.g., charging pump flow and letdown valve flow), in a semiautomatic or manual mode of operation. The invention provides integration of the automatic semiautomatic and manual modes on a single man-machine interface device, with the master control of a system parameter such as pressurizer level, which is responsive to at least two system components (charging pumps, letdown valves), each of which can adjust a different system variable.

The setpoint for automatic master control, is selected and displayed on the device, along with the current value of the setpoint parameter (pressurizer level). In the semiautomatic master mode selectable by the operator on the device, either a setpoint or an output demand can be specified for one of the components, e.g., the charging pumps, and the master controller will then adjust the other component (letdown valves) accordingly. When all subgroup controls are in the manual mode, the master controller is completely overridden by operator control of each component or subgroup, but the process parameter continues to be displayed to the operator. Moreover, on the same display device, indicators of the subgroup or component variables such as flow rate or component condition are also shown.

In order to minimize the space occupied by each such man-machine interface device, dynamic, touch-sensitive display techniques are utilized. Several regions of the device have a static display which preferably includes indicators and switches which always are associated with a given type of information or selection option. An additional region on the display device has dynamic image pagination which combines indicators, switches, and modulation capabilities for both the system level associated with the process parameter or optionally with the relatively low level associated with the subgroups or components.

In a particular embodiment, the invention is directed to a process plant having a system in which a process operating parameter varies in response to the state of at least two system components or subgroups of components each of which can adjust a different system variable, and a process controller including a computer driven interactive graphics display device coupled to the system such that for a setpoint value of the process operating parameter the components or subgroups can automatically adjust at least one variable to achieve the process operating parameter setpoint. The improved process controller includes a first region on the display device, for generating an image of a first meter, the process operating parameter setpoint, the value of the process operating parameter and preferably a bar graph representation of the process deviation from setpoint. A second region on the display device generates an image of a second meter and the value of one of the variables. A third region on the display device generates an image of a third meter and the value of the other of the variables. Means are displayed on the device for activating one of three system control modes including automatic, semiautomatic, and manual. In automatic, the setpoint value of the process operating parameter is automatically established, and any one or more of the components or subgroups will automatically adjust at least one of the variables to achieve the process operating parameter setpoint. In semiautomatic, for a given setpoint value of the process operating parameter, any one or more of a subset of all the components will automatically adjust at least one of the variables to achieve the process parameter setpoint. In manual, the operator specifies the outputs or setpoints of all subgroup variables, thereby overriding automatic adjustments of the parameter or variables. A fourth region on the display device, selectively generates either of two distinct component control images, wherein one of the component control images includes means for manually adjusting one of the variables, and the other of the component control images includes means for manually adjusting the other of the variables, such that the process controller can be operated in either of the semiautomatic or manual modes.

In a more particular implementation, the invention is directed to a touch sensitive electroluminescent display device for controlling a process dependent parameter in either automatic, semiautomatic or manual modes, wherein the device has a display screen substrate and means for generating images superimposed on the substrate, and the process is performed by at least two subsystems each of which has at least one component capable of adjusting a process independent variable. First, second and third substrate regions are provided, each having a respective plurality of superimposed static indicator and switch images thereon. A fourth substrate region can be selectively activated to dynamically superimpose each of a plurality of indicator and switch images thereon. The superimposed images on the first substrate region include indicators of the current value of the parameter, the current setpoint for the parameter, bargraph representation of parameter deviation from setpoint, the current mode of control for the process, and a switch for selectively activating the fourth region. The superimposed images on the second region include indicators of the current value of one of said variables, the current setpoint value for said one variable, bargraph representation of deviation from setpoint, the identification of the components capable of adjusting said one variable, the current mode of operation of the components capable of adjusting said one variable, and a switch for dynamically selecting one of at least three first subsystem image patterns in the fourth region, including opening or closing one or more of the components, adjusting the output demand of one or more of the components, and establishing an operator override setpoint for the one variable. The superimposed images on the third region include indicators of the current value of the other of said variables, the current setpoint value for said other variable, the bargraph representation of deviation from setpoint, the identification of the components capable of adjusting said other variable, the current mode of operation of the components capable of adjusting said other variable, and a switch for dynamically selecting one of at least three second subsystem image patterns in the fourth region, including opening or closing one or more of the components, adjusting the output demand of one or more of the components, and establishing an operator override setpoint for the other variable.

DESCRIPTION OF THE PREFERRED EMBODIMENT

The present invention will be described in the context of a nuclear power plant, particularly a pressurized water reactor plant having the NUPLEX 80+advanced control room complex as available from ABB Combustion Engineering, Inc., Windsor, Connecticut. The invention may be implemented for other types of processes, whether or not involving nuclear power, and with other control room designs. The invention to be described herein is, however, adapted to operate side by side with the indicators, alarms, and signal validation systems and methods described in the above-mentioned International Pat. application Ser. No. PCT/US89/04899, the disclosure of which is incorporated by reference.

A nuclear power plant, as well as many other industrial process plants, has multiple systems involving perhaps thousands of components. In a nuclear plant, these components are subject to control action effectuated through either the engineered safety feature component control system (ESF-CCS) and/or the process component control system (Process-CCS). Unless otherwise indicated, the term "component control system" or "CCS", can refer to either or both the ESF-CCS or Process-CCS.

The CCS provides control of all plant process components (e.g., pumps, valves, fans, heaters, circuit breakers) that are controlled from the main control room. CCS type equipment can also be supplied for components in locally controlled process systems (e.g., waste management, fuel handling pool, etc.). The CCS controls both discrete state and continuous devices. It acquires all inputs needed to generate appropriate control outputs. It also acquires related inputs that may not be used in the control function but are required for display and alarm in the main control room. Controlled plant components include circuit breaker and contactor operated components such as pumps, fans, heaters and motor-operated valves, and solenoid-operated components such as pneumatic, electro-pneumatic and direct operated valves. The CCS also control continuous devices such as modulating electro-pneumatic valves. The CCS provides data acquisition of discrete binary and pulse signals indicative of plant system and component status and analog signals which represent various monitored and controlled plant parameters.

Figure 1:
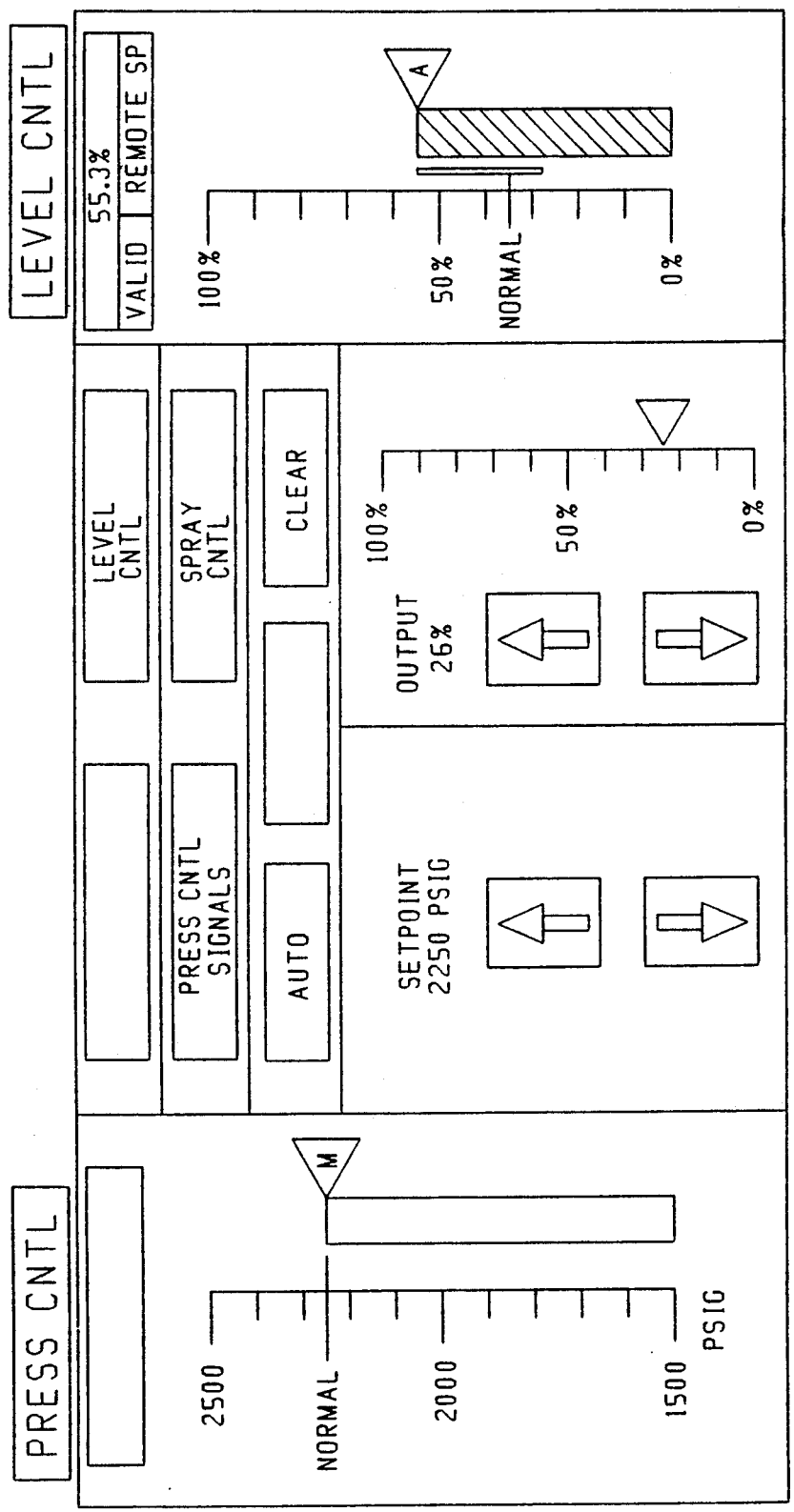
FIG. 1 depicts a screen display for the high level process control of a pressurizer in a nuclear power plant, in accordance with one technique of the prior art.
Figure 2:
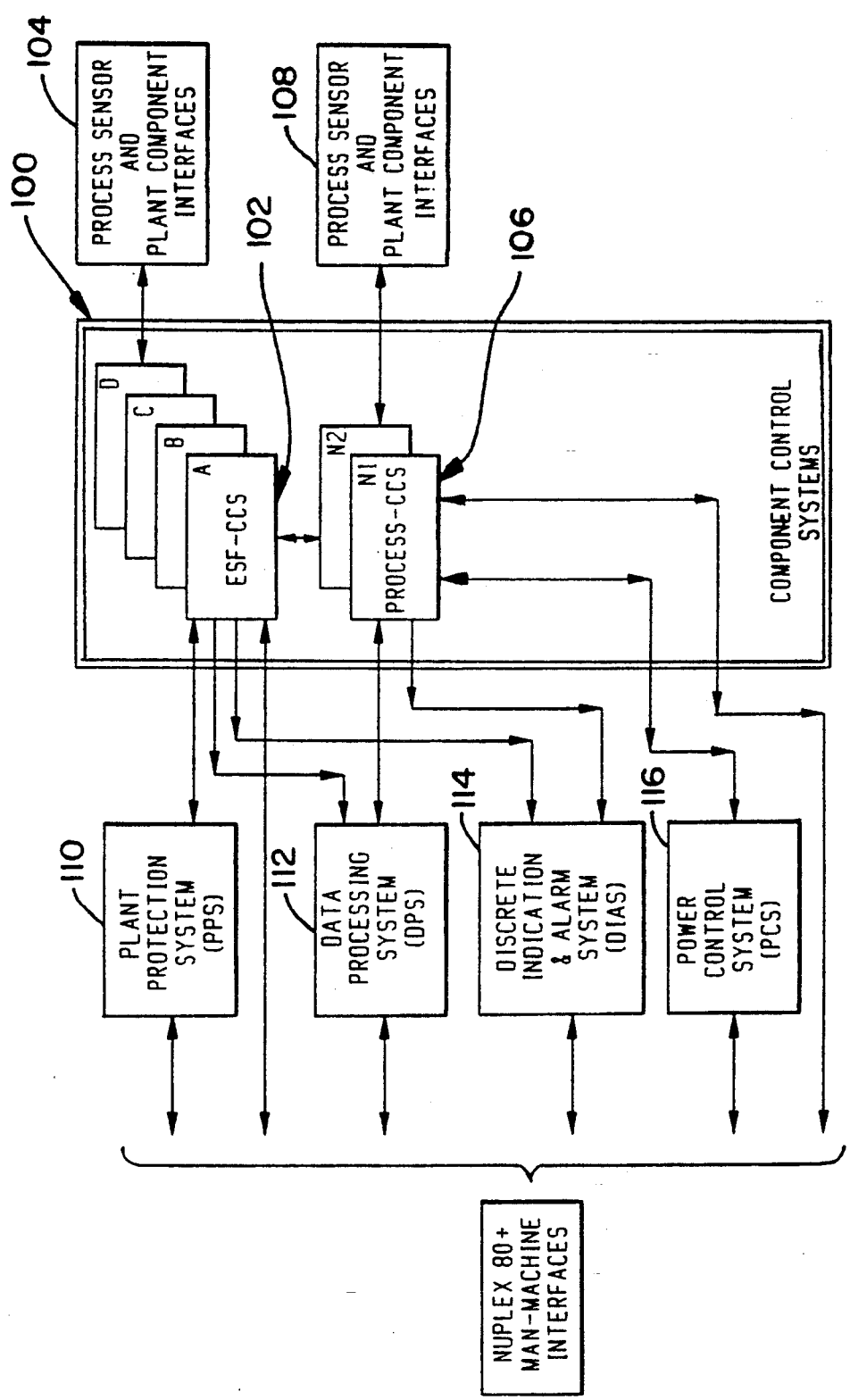
FIG. 2 is a functional block diagram of the component control systems of a nuclear power plant for which the present invention is adapted.

A functional block diagram 100 of the preferred CCS is shown in FIG. 2. The ESF-CCS 102 accommodates safety-related plant components and systems 104 which include Engineered Safety Features Systems. The ESF-CCS consists of four independent divisions to control four independent divisions of mechanical systems. The Process-CCS 106 accommodates non safety-related plant components and systems 108 related to normal plant process control. The CCS is a distributed programmable logic controller (PLC)-based system that performs plant component control and data acquisition functions. CCS equipment is channelized as shown in FIG. 2 in six divisions; A, B, C, D, N1, and N2. The ESF-CCS 102 includes divisions A, B, C, D while the Process-CCS 106 contains division N1 and N2. Divisions A, B, C, and D are physically and electrically independent from each other and from division N1 and N2. Equipment in these ESF-CCS divisions is located in physically separate zones within the nuclear plant complex. Division N1 and N2 subsystems are not physically separate or electrically isolated from each other.

Each division of the ESF-CCS 102 receives initiating signals from all four channels of the Plant Protection System (PPS) 110 and performs selective 2/4 logic to automatically or manually actuate plant Engineered Safety Features (ESF) systems 104. The ESF-CCS 106 performs data acquisition of various plant signals and provides the unscaled data to the Data Processing System (DPS) 112 and Discrete Indication and Alarm System (DIAS) 114. The DPS and DIAS use this data to generate displays and alarms.

The Process-CCS 106 provides discrete state and continuous control of non safety-related plant components and systems. The Process-CCS provides automatic and manual control of pressurizer pressure and pressurizer level by manipulation of related pumps, valves and heaters. The Process-CCS performs automatic and manual control of steam generator water level by regulating main feedwater flow to each steam generator. The Process-CCS facilitates automatic and manual control of plant secondary pressure by manipulation of valves which bypass secondary steam from the turbine generator to the condenser or to the atmosphere. The Process-CCS pressurizer, steam generator level and main steam pressure control features operate in conjunction with the Power Control System (PCS)

116 to facilitate rapid automatic primary power reduction to preclude reactor trip under transient conditions.

The Process-CCS performs data acquisition of various plant signals and provides the unscaled data to the DPS and DIAS. The Process-CCS receives redundant, isolated safety-related parameter signals and performs validation to derive controlling signals that are representative of the process under control. Controlling signals are unaffected by safety-related signal single failures, thus avoiding adverse control/protection interaction. The man-machine interfaces 118 include the process controller interfaces that are the subject matter of the present invention, and which are described in greater detail below.

Figure 3:
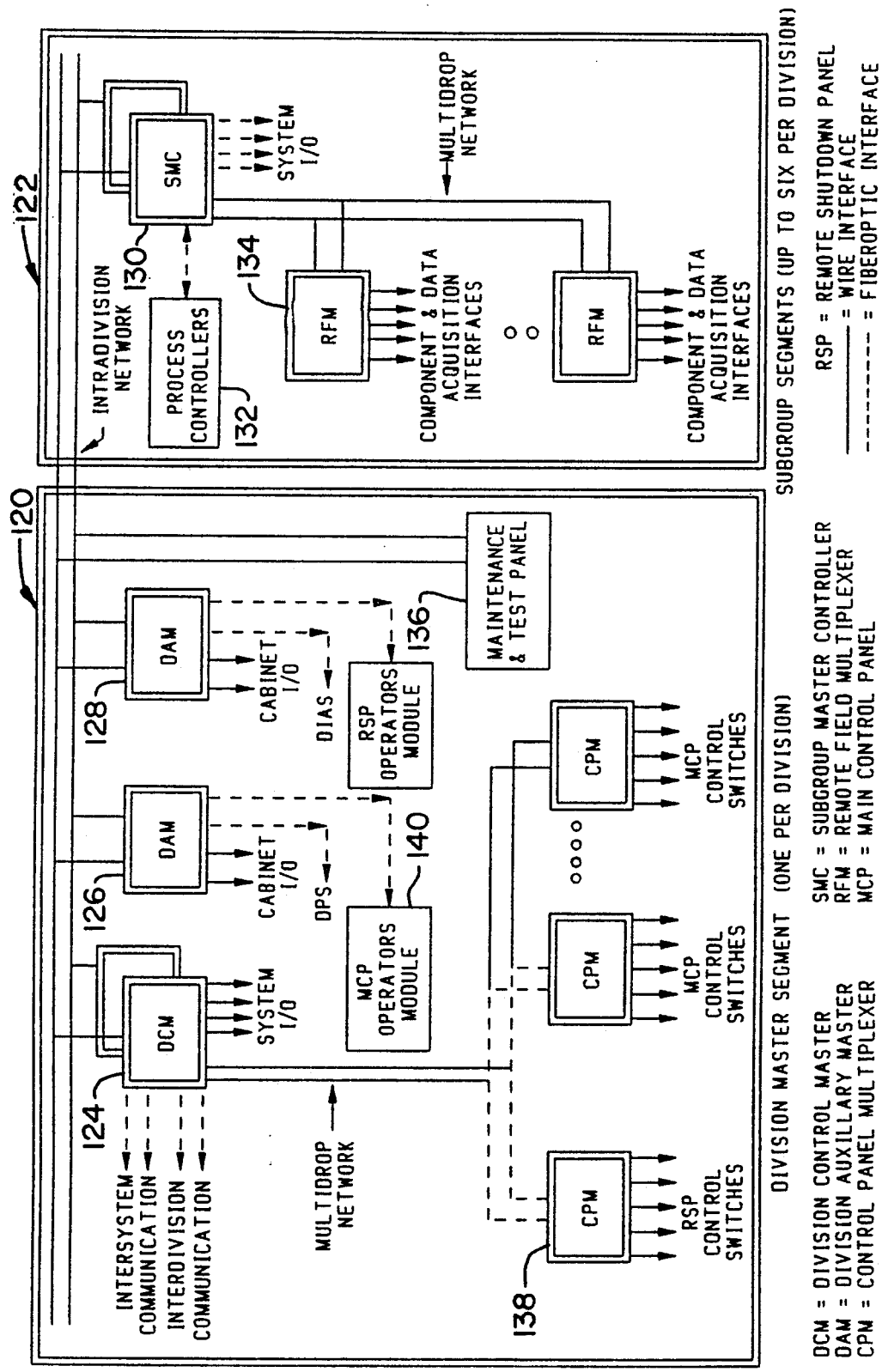
FIG. 3 is a functional block diagram for the divisions of the component control systems shown in FIG. 2.

A CCS division block diagram is shown in FIG. 3. A CCS division, such as N1 of FIG. 2, contains one division master segment 120 and up to six subgroup segments 122 as required to support division loading. The division master segment 120 contains one redundant division control master (DCM) 124 to support intersystem and interdivision datalink communications, system I/O and control switch I/O via control panel multiplexers (CPM). This segment also contains two division auxiliary masters (DAM) 126, 128 to handles cabinet I/O and datalink interfaces with the DPS, DIAS and operator modules. The division master segment 120 also contains a maintenance and test panel 136 which serves the entire division. Each subgroup segment 122 contains one redundant subgroup master controller (SMC) 130 to support system I/O and datalink interfaces to the process controllers 132. Each subgroup segment supports up to 12 remote field multiplexers (RFM) 134 to accommodate I/O interfaces to plant components and sensors.

Communication between the division master segment 120, the subgroup segments 122 and the maintenance and test panel 136 is provided by a redundant intradivision network. Communication within the division master segment and within each subgroup segment is provided by redundant multidrop networks. Fiberoptic cable is utilized to provide electrical isolation for discrete, datalink and network interfaces where required for interchannel or geographical location independence.

Figure 5:
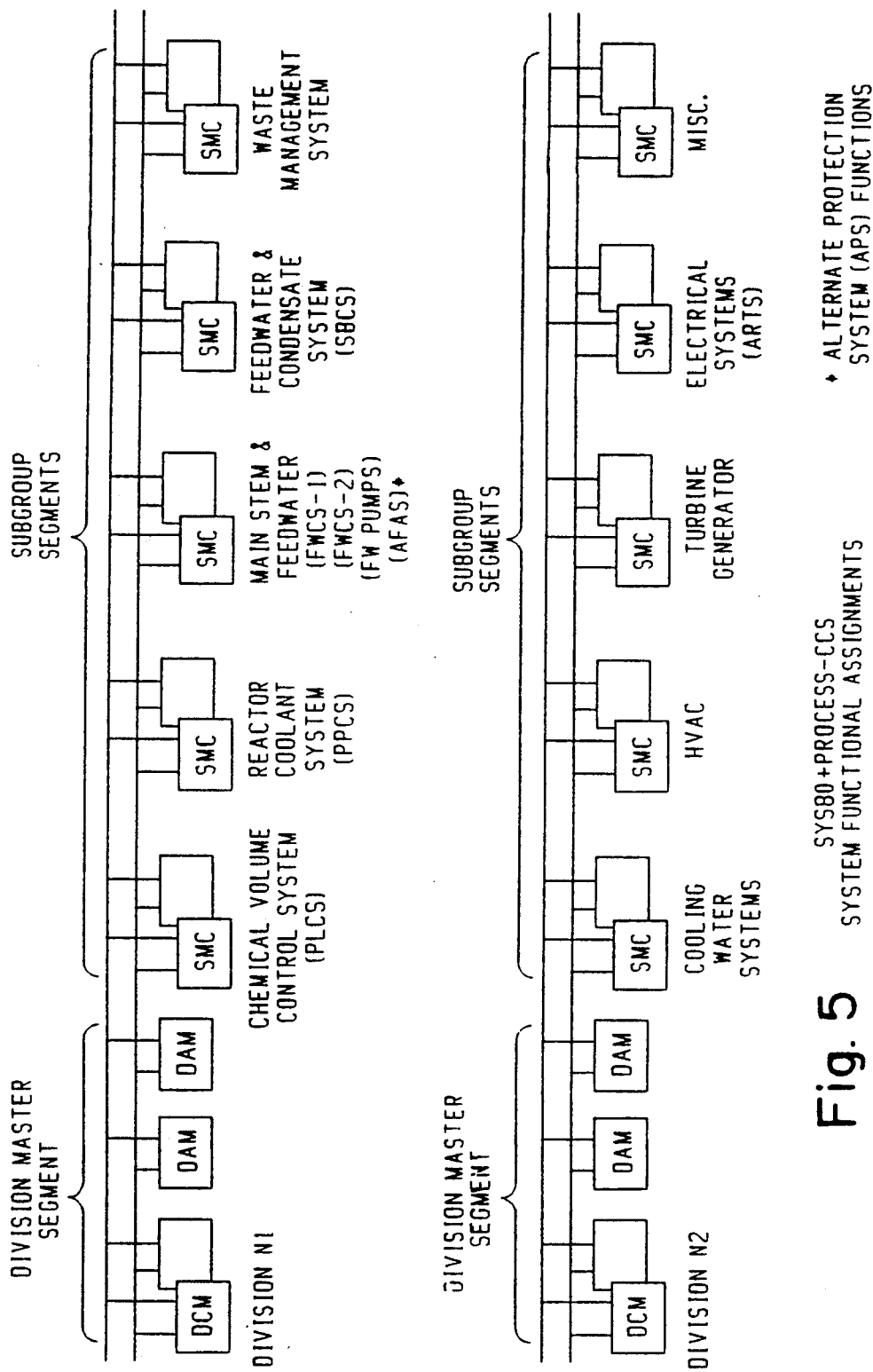
FIG. 5 is a diagram representing the nuclear power plant system functional assignment to the process component control systems.

The major Process CCS operator interface devices are process controllers 132, control switches 138, and operator modules 140. These devices are located on control room panels and are used for normal operation of the plant. A subset of these devices are located on the RSP to facilitate hot and cold plant shutdown from this location. The Process-CCS controls the following systems in the SYS80+ Advanced Light Water React (ALWR) design:

Chemical Volume Control System
Reactor Coolant System
Main Steam System
Feedwater System
Condensate System
Waste Management System
Cooling Water Systems
HVAC Systems
Turbine Generator Auxiliaries
Electrical Distribution Systems
Gas Turbine Generator Assignment of these plant systems to Process-CCS subgroup segments are made as shown in FIG. 5. This system assignment approach results in a control system architecture with predictable failure modes which support safety analysis assumptions. The architecture also minimizes reliance on intradivision communication networks since most system interface signals are confined within individual subgroups segments.

In addition to component control and single loop process control, the Process-CCS provides the following process control functions Pressurizer Level Control (PLCS)
Pressurizer Pressure Control (PPCS)
Main Feedwater Control (FWCS-1, FWCS-2)
Steam Bypass Control (SBCS)

Figure 6:
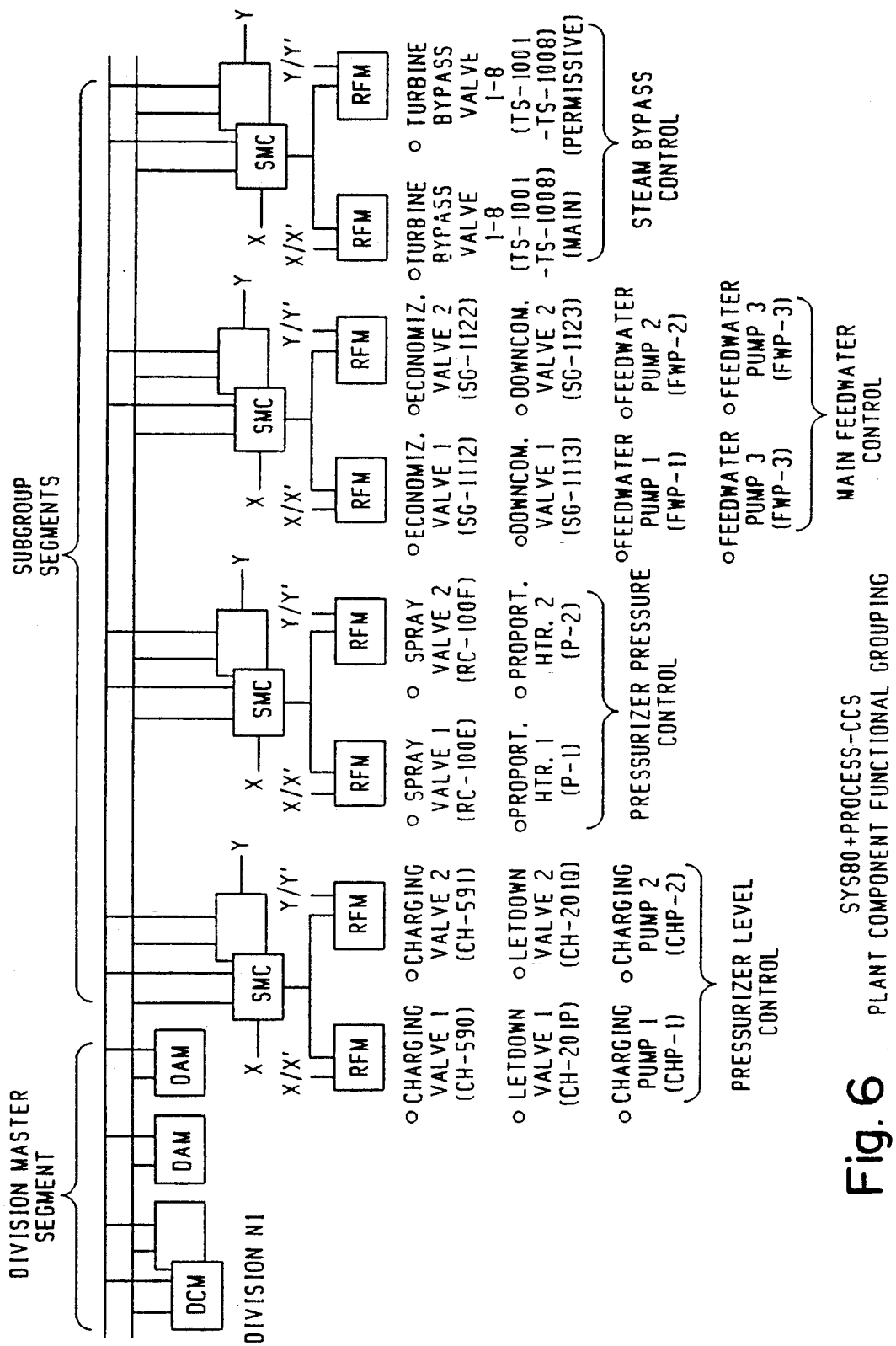
FIG. 6 is a diagram representation of the component functional groupings associated with the division master segment and subgroup segments depicted in FIG. 5.

Plant components are functionally grouped within subgroup segments to support the level of redundancy and independence of the plant system design. Examples of functional grouping for process control components are given in FIG. 6.

Typical process controller devices 132 (FIG. 3) that are the subject of the present invention, are represented in FIGS. 7-14 (for pressurizer level control) and FIGS. 15-20 (for pressurizer pressure control). Process controllers 200 are dynamic interactive graphics display devices used by the plant operator to monitor and manipulate process control functions. Process controller design is based on programmable electroluminescent display technology with touch sensitive screens. Each process controller display is designed (programmed) for its specific application in accordance with a standardized graphics template to provide design and operational consistency. This design approach minimizes potential for operator-induced process control errors.

Figure 7:
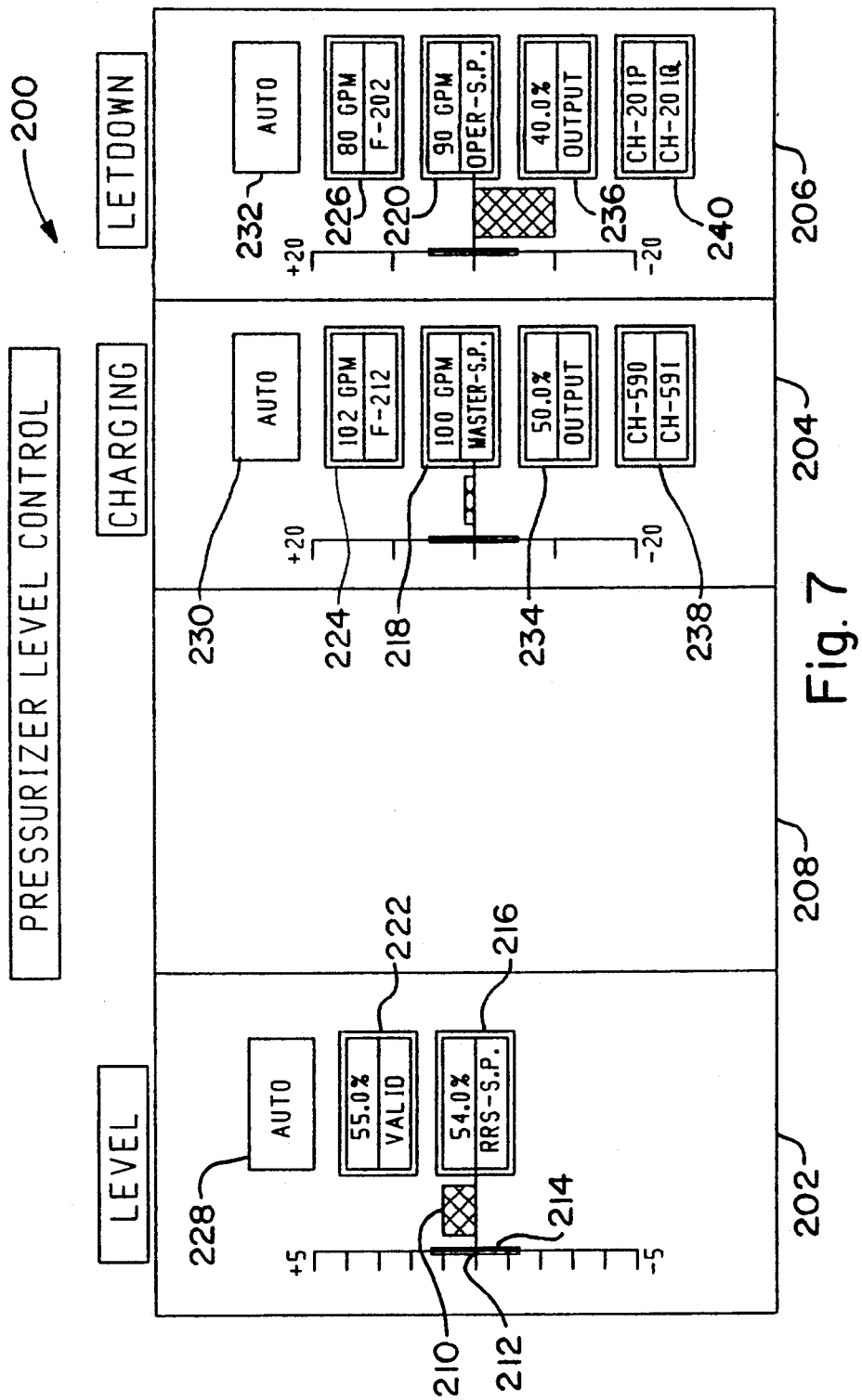
FIG. 7 depicts a man-machine interface device having an electroluminescent, touch sensitive screen for enabling the operator to perform process control of the pressurizer level in automatic, semiautomatic, and manual modes, in accordance with the present invention.

The standardized display 200 is divided into static and dynamic sections as shown in FIG. 7 (Pressurizer Level Control is used as a typical example). In the static first 202, second 204, and third 206 sections, only parameter values and text labels vary. Touch targets in these sections remain fixed. Conversely, graphics in the fourth 208, dynamic section change upon operator demand based on touch target selection from the static sections. Operator selectable touch targets in all display section are denoted by double borders.

Master loop control section 202 and subloop control sections 204, 206 include meter-type displays which can include bar graph representations 210 of process deviation from applicable setpoints 212. Normal deviation band 214 is also included as part of the scale. Bar graphs 210 are aligned with setpoint selection targets 216, 218, 220 and controlled parameter selection/display targets 222, 224, 226 are located directly above. This information, in conjunction with process trend information on DIAS indicator displays, provides a concise representation of control loop performance at a glance. Master control loop operating mode status 228 and subgroup mode status 230, 232 (i.e., SEMI-AUTO, AUTO, or MANUAL), demand (i.e., OUTPUT) and subloop component selection 238, 240 (i.e., CH-XXX) are also displayed in static sections. Subloop component selection targets as shown are "selection" shaded to identify which components have been selected.

(a) Master Loop Control Signal Selection (Automatic)

Figure 8:
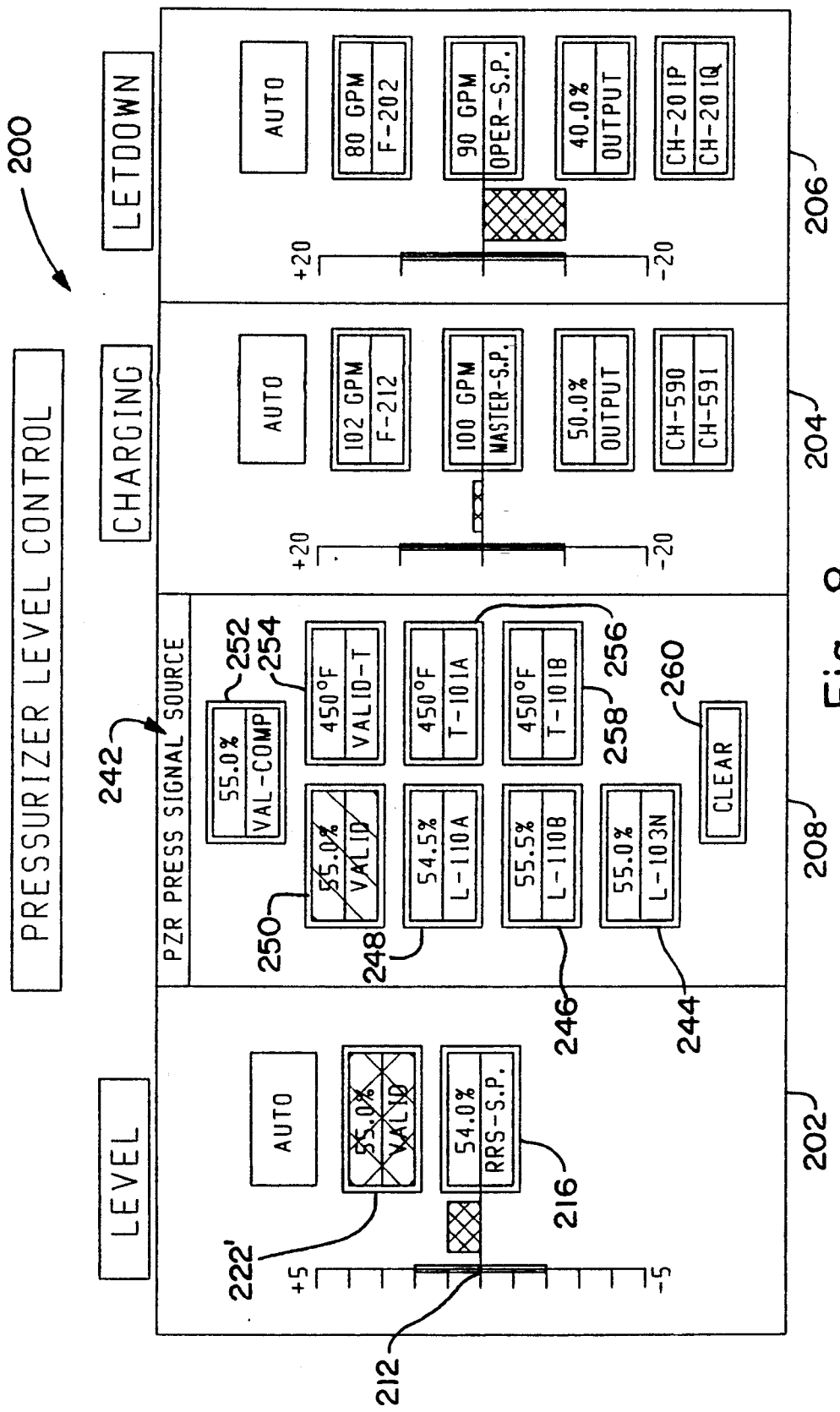
FIG. 8 depicts the device of FIG. 7, after the operator has made the selection that identifies and provides the current value of the per cent level signals that can be assigned to the master loop process parameter.

FIGS. 7 and 8 demonstrate operator selection of the master, i.e., automatic, loop control signal. The operator touches the VALID target 222 in the first master loop control section in FIG. 7, and the target changes to reverse video. Upon removal of the finger from the screen, this target changes to "touch" shading 222 and the selection menu 242 appears in the fourth, dynamic section 208 as shown in FIG. 8. Touch shading (depicted as crosshatch lines) is used to identify the source of the display in the dynamic section.

This control signal selection menu 242 identifies possible sources of percent level signals that can be assigned as the master loop process variable. Possible selection targets are level sensors L-103N, L-110B, L-110A (244, 246, 248), a validated composite of the sensor signals, VALID COMP 252, or VALID-T 250 (temperature compensated valid). Also shown are targets for selectable temperature compensation signals 254, 256, 258. The currently selected percent level signal (VALID) is highlighted by "selection" shading (parallel hatch lines). In FIGS. 7 and 8, the master loop setpoint 212 is specified by the reactor regulating system, not directly by the operator. All subloops are under the control of the master because subloops are selected to auto.

Upon completion of selection, the operator may leave the display of FIG. 8 as is, delete the dynamic section image pattern by selecting the CLEAR target 260 which returns the display to that as shown in FIG. 7, or overwrite the dynamic section directly with an alternative selection from any static section 202, 204, 206. In any mode, the display automatically updates displays of dynamic variables including deviation bar graphs 210, digital readouts at, e.g., 224 and 226, and status text.

(b) Subloop Control Setpoint Selection (Semiautomatic)

Figure 9:
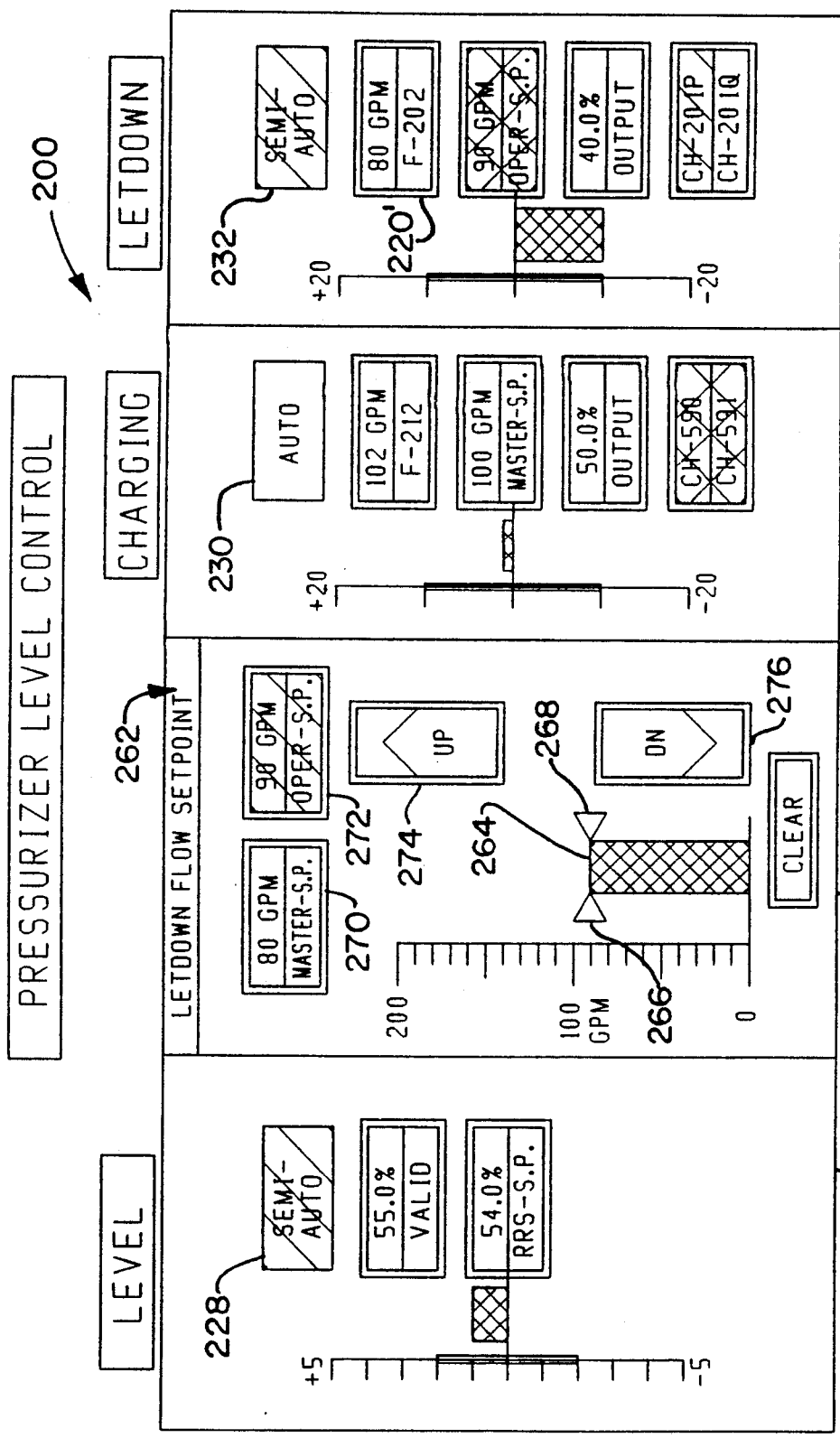
FIG. 9 depicts the device of FIG. 7, after the operator has paged through the dynamic image region of the screen to an image pattern by which the letdown flow setpoint in gallons per minute, can be adjusted.

FIG. 9 demonstrates operator adjustment of a subloop control setpoint. The operator selects the operator setpoint target 220 (touch shaded) in the third, letdown section 206, revealing the setpoint display 262 as shown in the fourth section 208. This display has a bar graph 264 which shows the current letdown flowrate. On either side of the bar graph are arrows 266, 268 which show the master setpoint and operator setpoint values for the letdown subloop. The bar graph is directly centered below setpoint selection touch targets 270, 272 which display the setpoint values digitally. Setpoint arrows are oriented such that the digital setpoint is displayed above its respective arrow.

The selected letdown control setpoint 272 is "selection" shaded in the fourth section 208. If the operator wishes to adjust the setpoint, the operator setpoint target is touched in the fourth section, and the setpoint is increased or decreased by touching the UP or DN touch targets 274, 276. Upon completion of setpoint manipulation, this screen is deleted or replaced by methods described in (a) above. So long as the operator specifies a subloop setpoint, the system remains in the semiautomatic control mode as shown at 228 and 232, i.e., the master controller continues to operate, thereby controlling charging flow automatically (as shown at 230) based on the reactor regulator setpoint, which reflects the effects of the operator setpoint on letdown flow.

(c) Subloop Output Control Selection (Semiautomatic)

Figure 10:
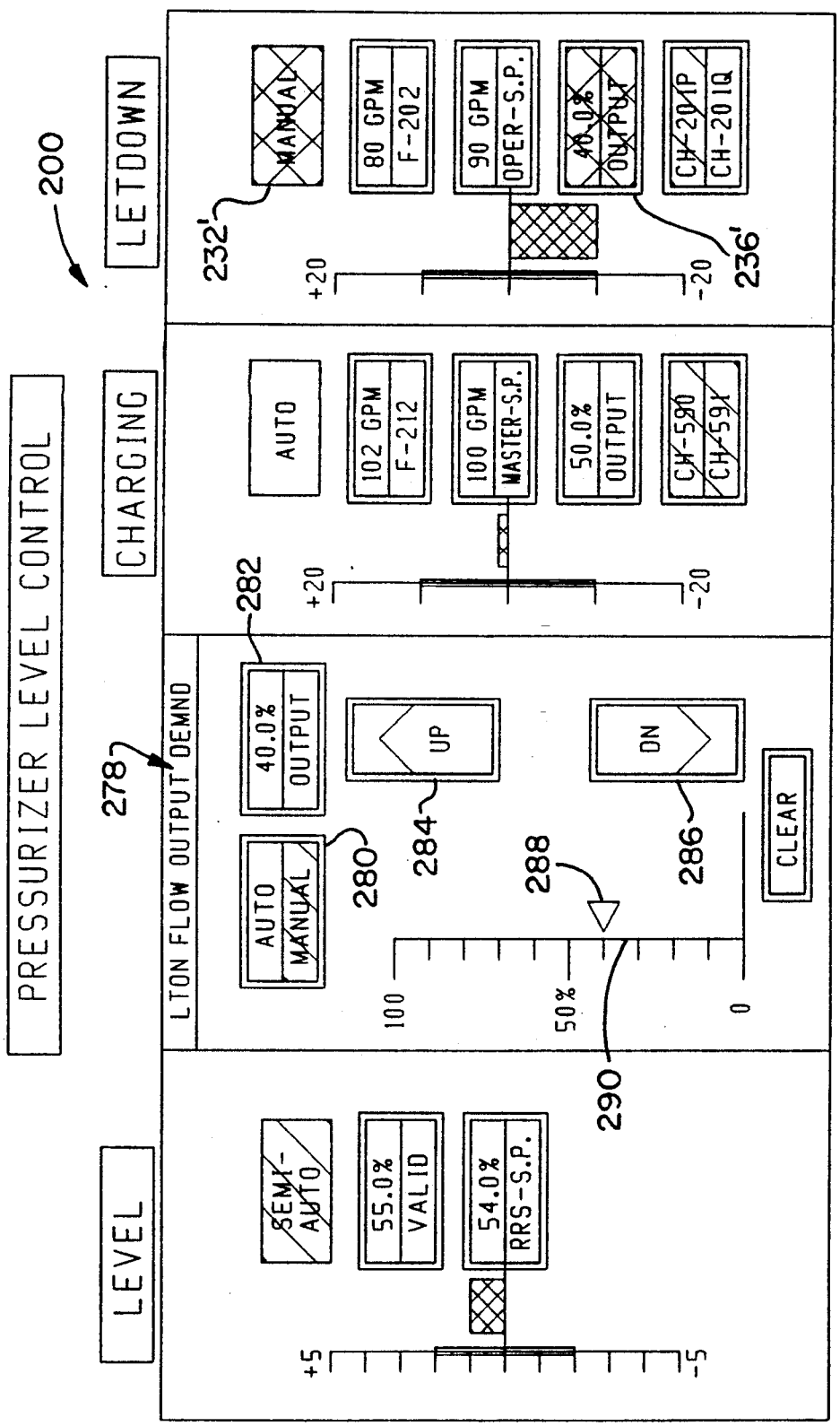
FIG. 10 depicts the device of FIG. 7, after the operator has paged through the dynamic image region to an image pattern by which the letdown flow output demand in percent of full flow, can be adjusted.

FIG. 10 shows a typical subloop control output selection display. The operator has selected the OUTPUT target 236' in the letdown section 206, revealing the dynamic section display 278 as shown. The mode display 232' in the subloop section is "touch" shaded for "manual". The manual mode touch target 280 in the dynamic section 208 in this example, is "selection" shaded to show that the letdown subloop is in the manual mode. The current output (40%) is also displayed at another target 282 in the dynamic section. In the manual mode, the output is varied using the UP or DN touch targets 284, 286 and an arrow 88 with scale 290 is included to indicate the rate (slow or fast) of manual output variation. The RRS still sets the level setpoint, but only the charging is controlled automatically; the letdown flow has been manually specified.

(d) Subloop Component Selection (Semiautomatic)

Figure 11:
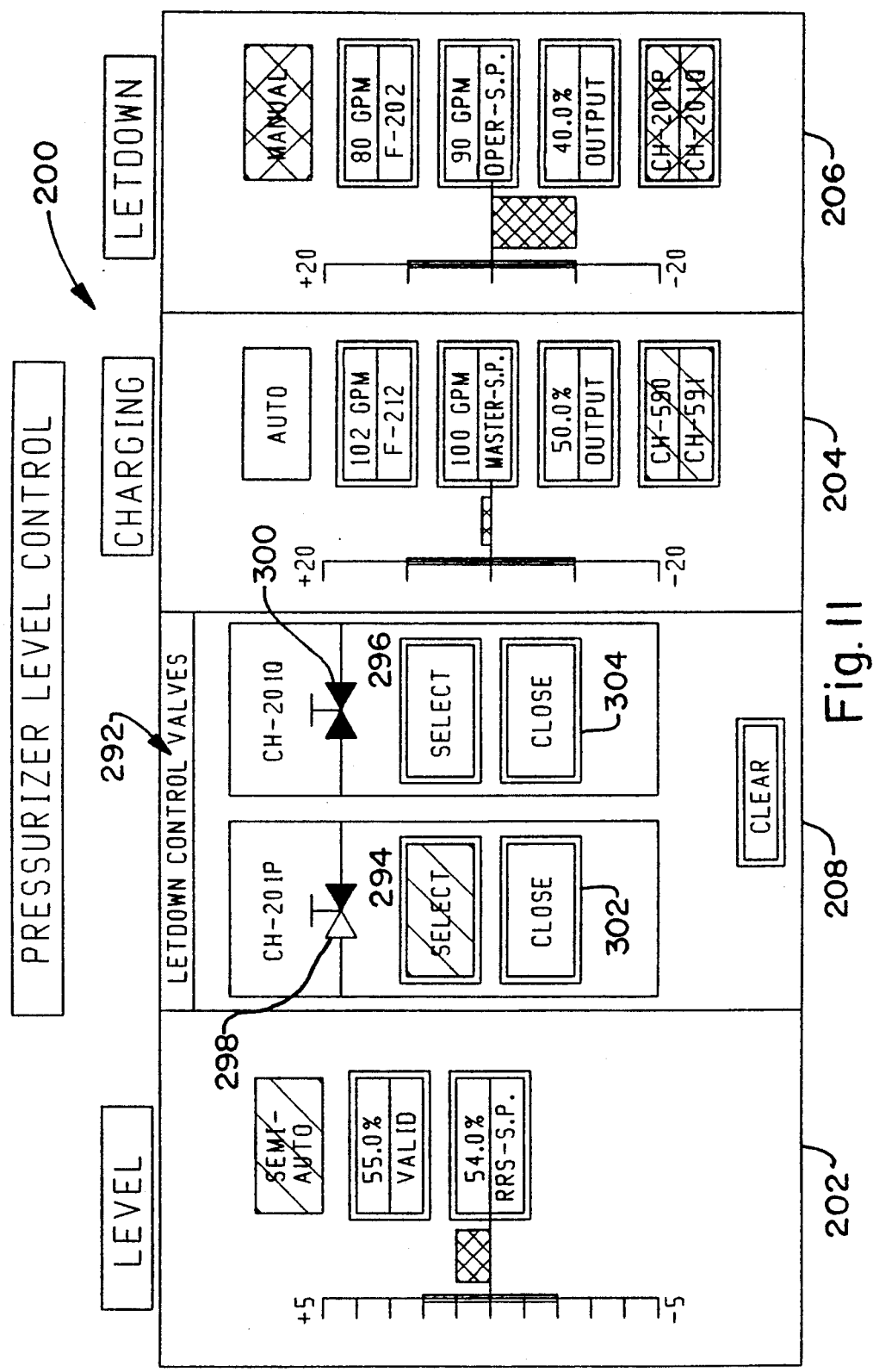
FIG. 11 depicts the device of FIG. 7, after the operator has paged through the dynamic image region to an image pattern enabling the operator to specify the open, closed, or intermediate position of either of the letdown valves.

FIG. 11 provides an example of a typical component selection feature within the letdown control subloop. The component selection target 240 for valves (CH-201P, CH-201Q) are selected in the third section 206 revealing the component display 292 as shown in the fourth section 208. This display 292 replaces discrete control switches on the control panel and mimics their operation for components controlled by the subloop. In this example, valve CH-201P is selected and CH-201Q is not as exhibited by SELECT target selection shading at 294 and 296. Component status is displayed via the component symbols 298, 300 (filled=closed, partial filled=intermediate position, unfilled=open). This symbology is consistent with that used for DPS displays. Touching the SELECT target 294 arms the component for controller operation based on subloop demand while touching the CLOSE target 302, 304 causes the component to close.

(e) General Discussions of Modes

It should be appreciated from the foregoing discussion, that although there are three modes of system control, only two modes, automatic and semiautomatic, utilize the master control logic. Thus, the only status indicators in the first region 202 that can appear in window 228 during master control, are AUTO and SEMI-AUTO. On the other hand, each of the subgroup or component loops in regions 204,206, is in either of only two states of control, auto or manual, depending on whether they are subject to the master control or whether they have been specified by the operator. Thus, the status windows 230,232 will show either auto or manual, to indicate the control status of the subgroup. As indicated above, if all the subgroups are in manual mode, the master control is overridden and will be neither in automatic nor semiautomatic. If desired, a manual indication may be provided in window 228 under these circumstances.

Figure 12:
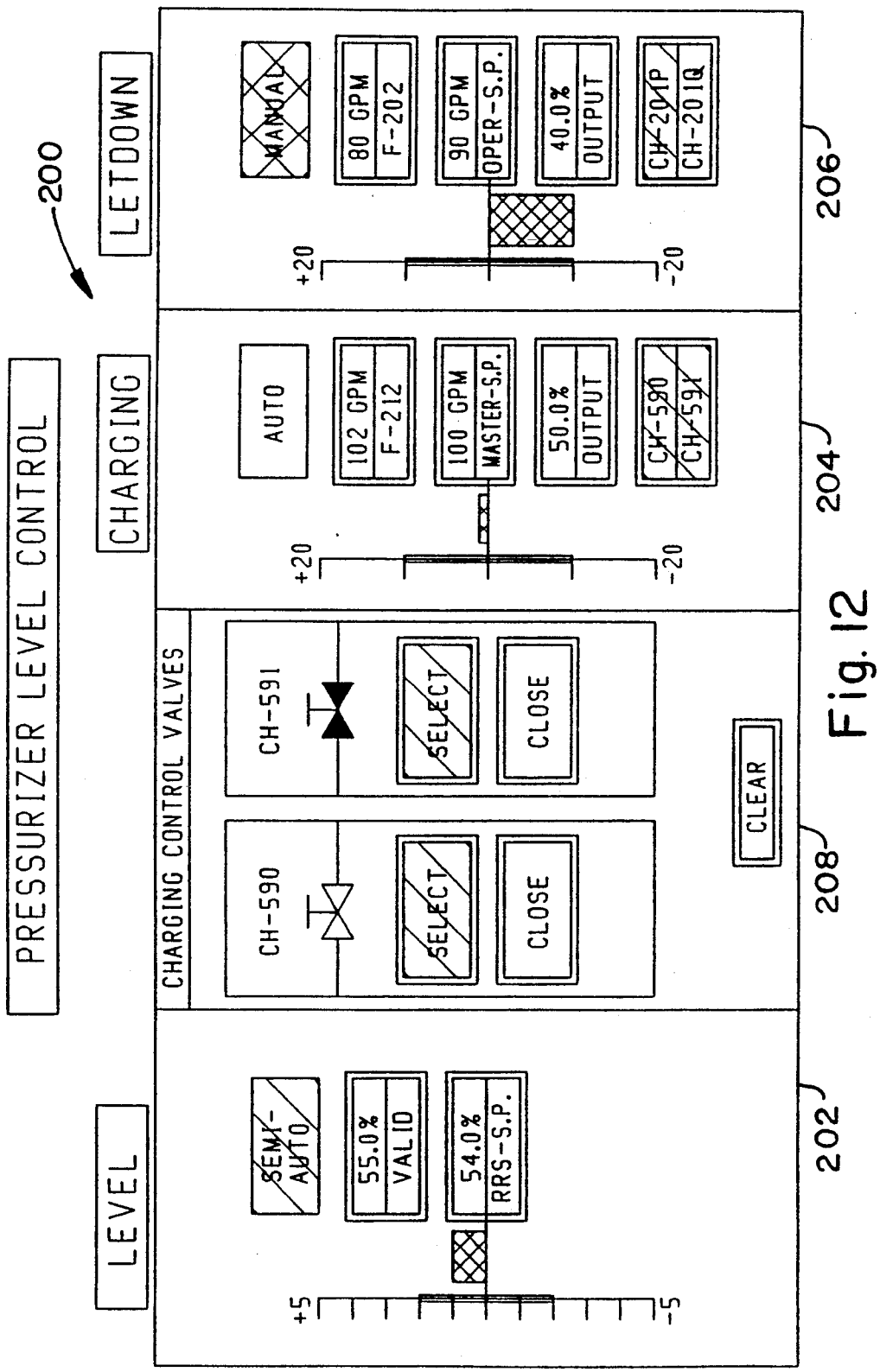
FIG. 12 depicts the device of FIG. 7, after the operator has paged through the dynamic image region to an image pattern whereby the operator may select (enable valve to be opened), or close either of the charging control valves.
Figure 13:
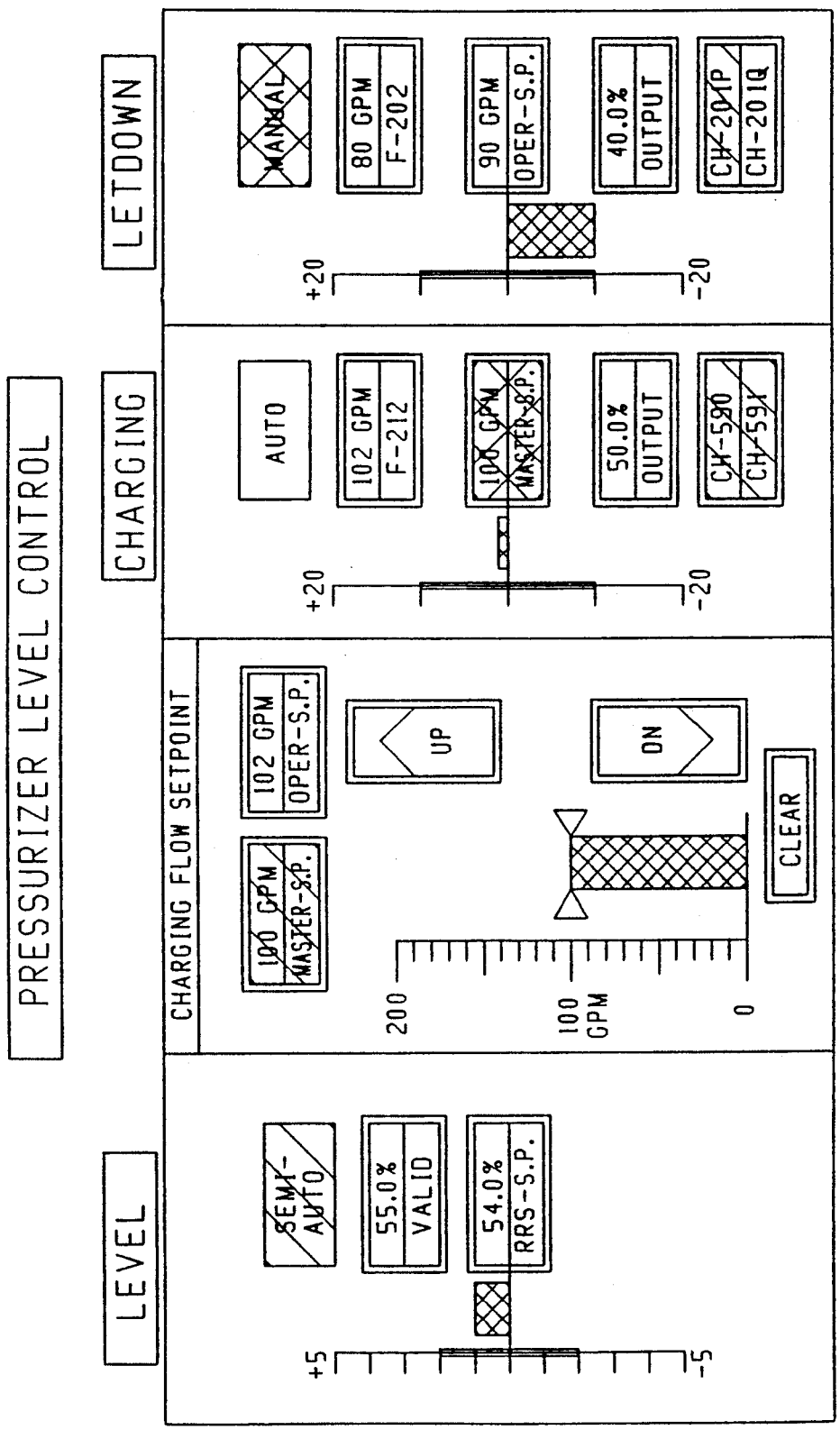
FIG. 13 depicts the device of FIG. 7, after the operator has paged through the dynamic image region to the image pattern by which the charging flow setpoint in gallons per minute can be adjusted.
Figure 14:
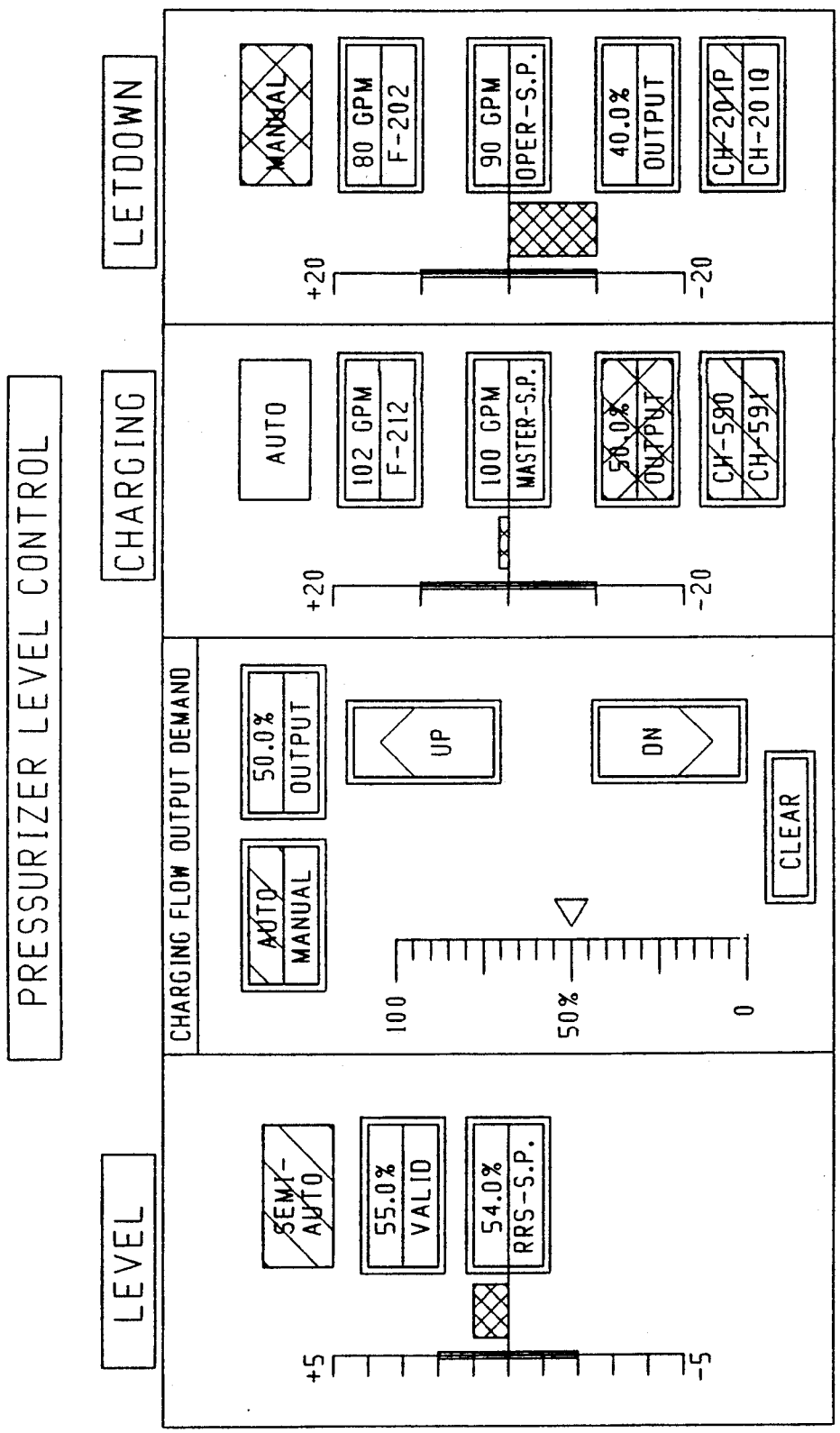
FIG. 14 depicts the device of FIG. 7, after the operator has paged through the dynamic image region to the image pattern whereby the operator can adjust the charging flow output demand in percent of full flow.
Figure 15:
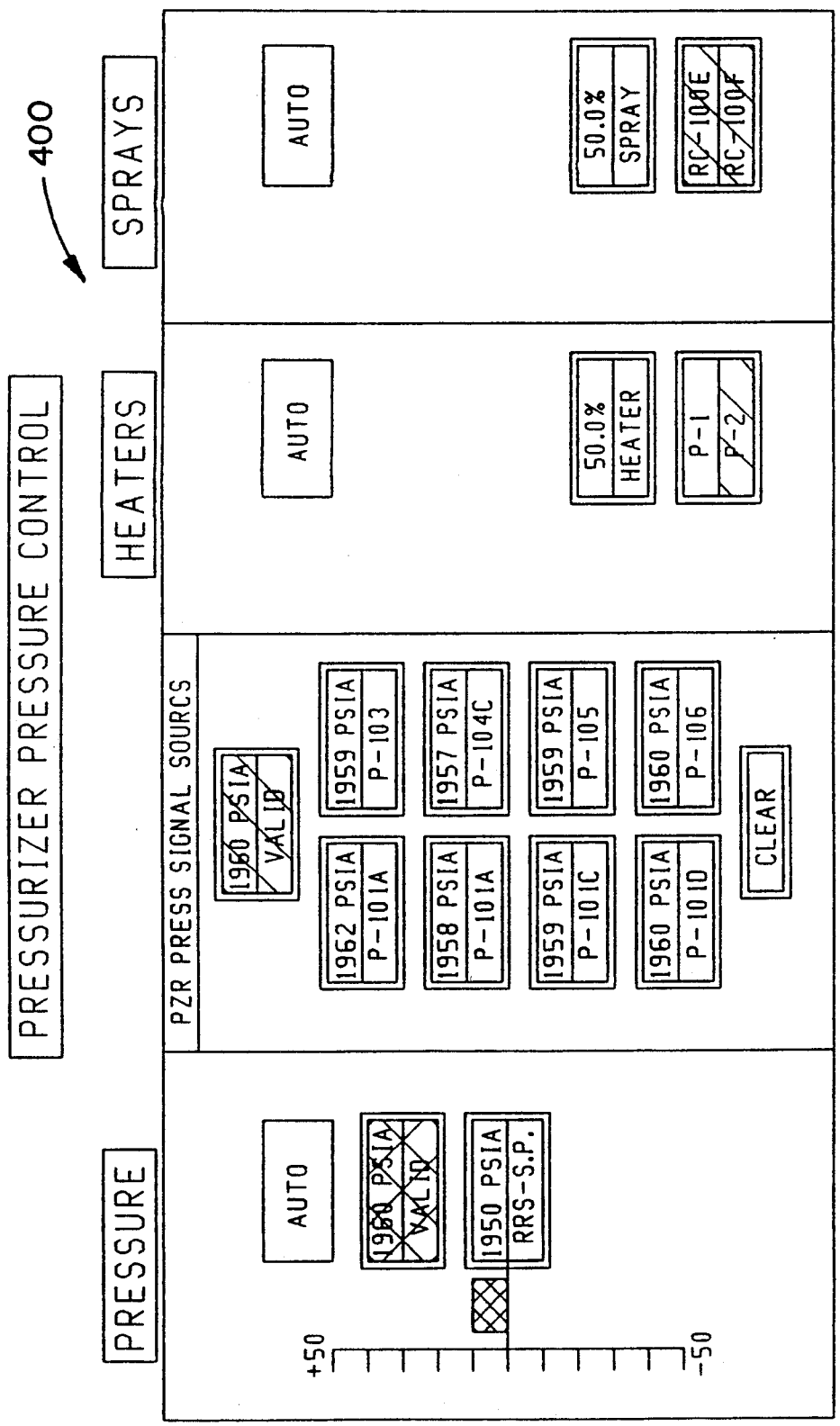
FIG. 15 depicts a device similar to, and in a condition analogous with, the device shown in FIG. 8, but for the process control of the pressure parameter of the same pressurizer.
Figure 16:
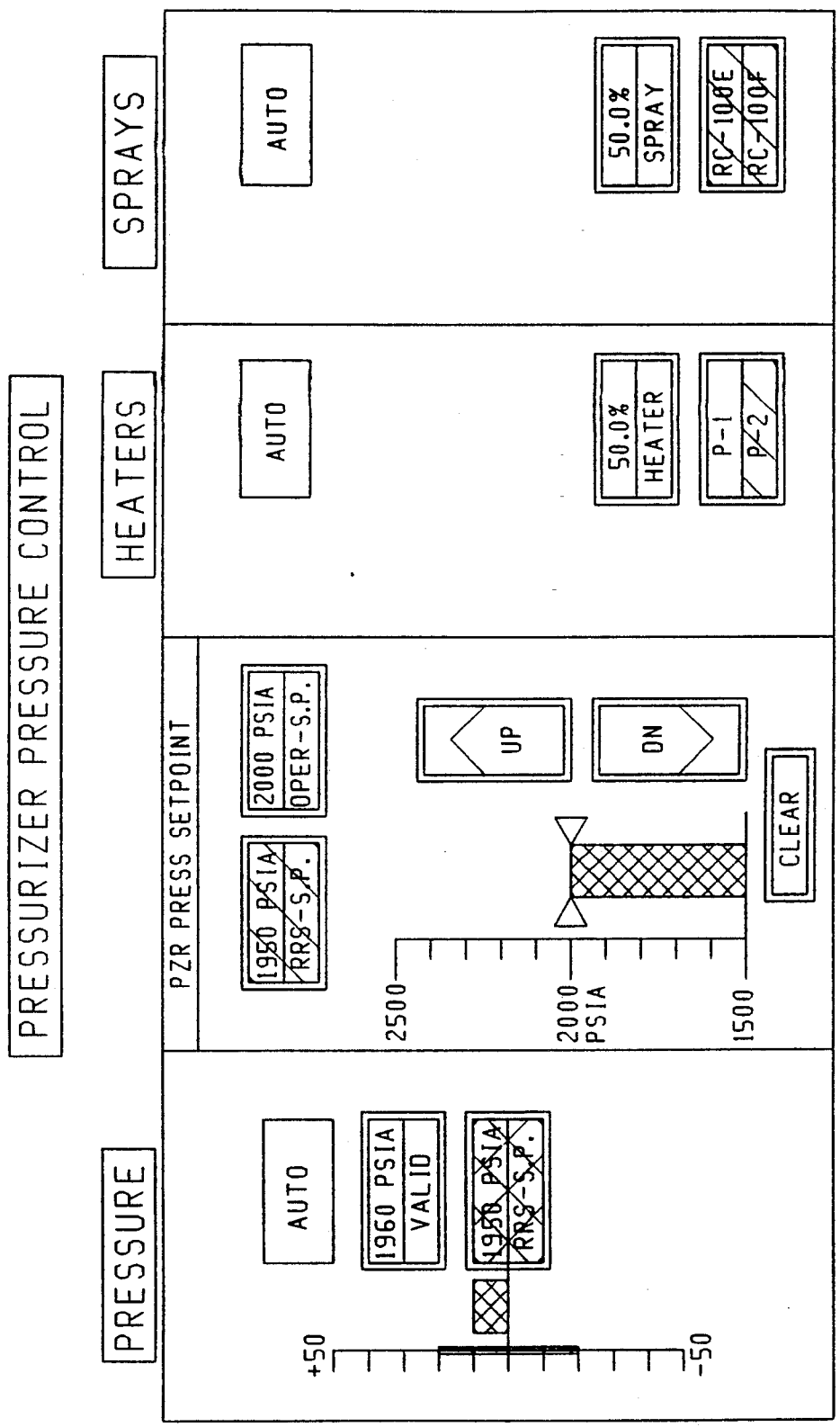
FIG. 16 depicts the device of FIG. 15, after the operator has paged through the dynamic image region, to the image pattern that enables the operator to specify the pressure setpoint.
Figure 17:
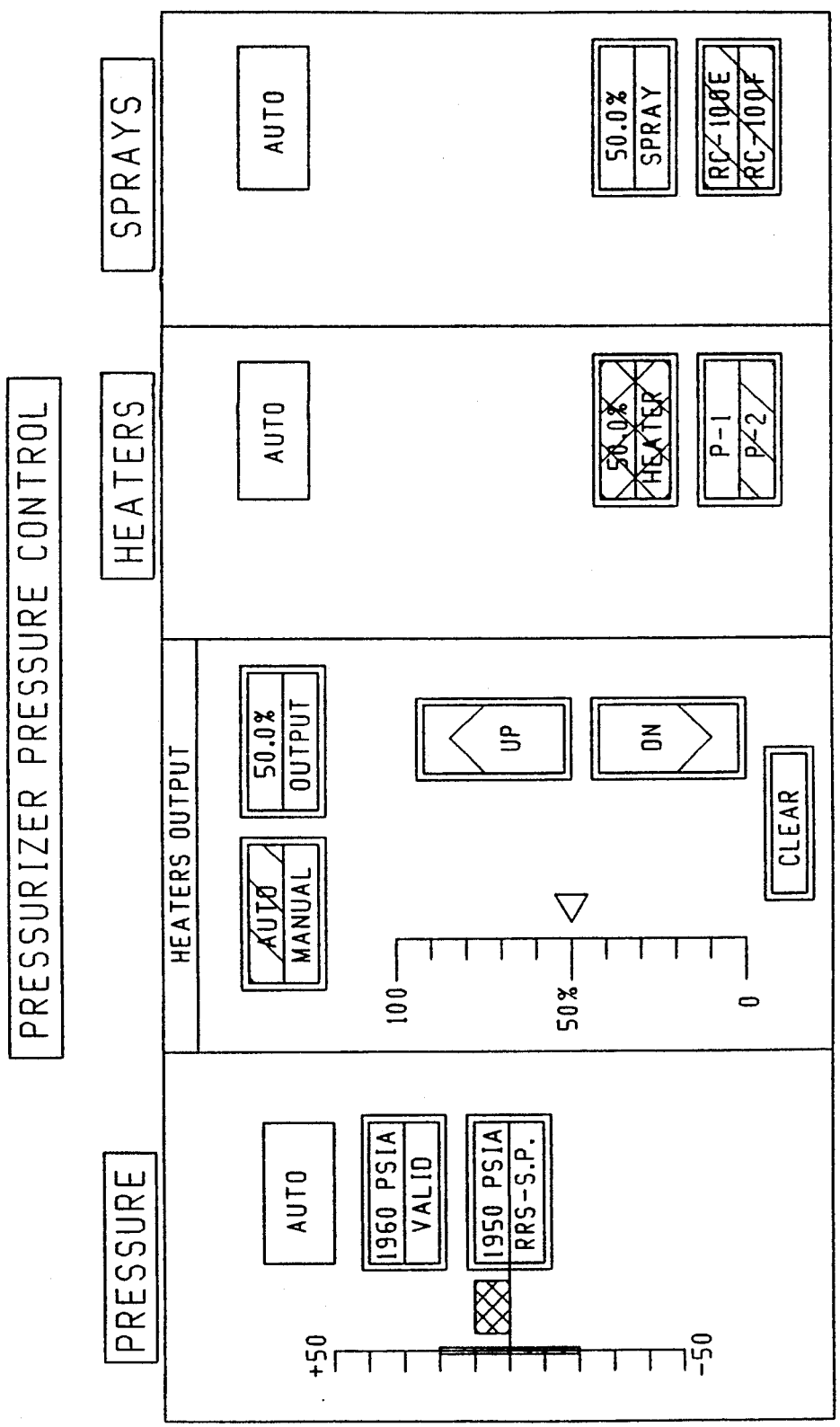
FIG. 17 depicts the device of FIG. 15, after the operator has paged through the dynamic image region to the image pattern that enables the operator to adjust the heater output.
Figure 18:
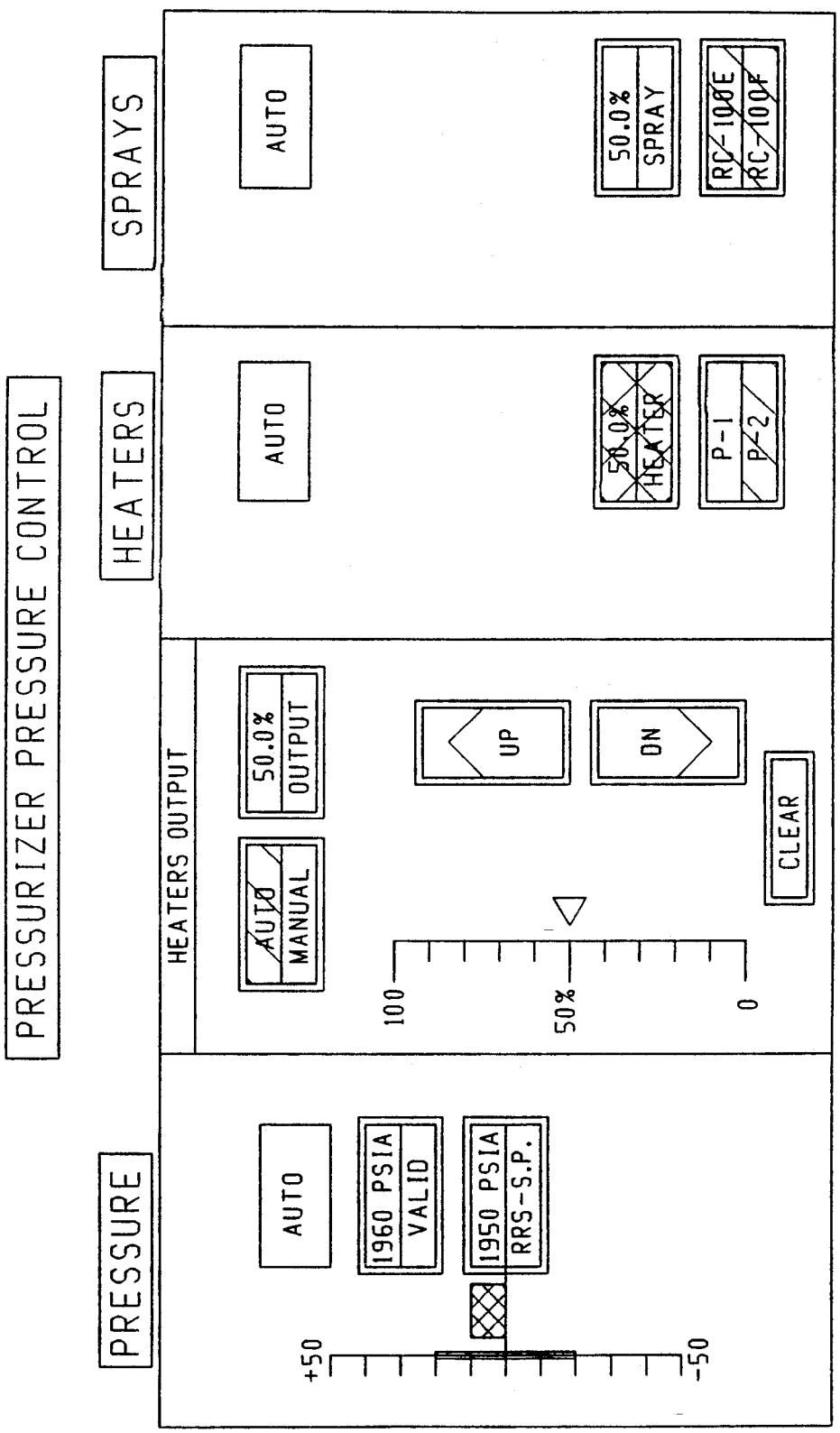
FIG. 18 depicts the device of FIG. 15, after the operator has paged through the dynamic image region to the image pattern that enables the operator to adjust the spray output.
Figure 19:
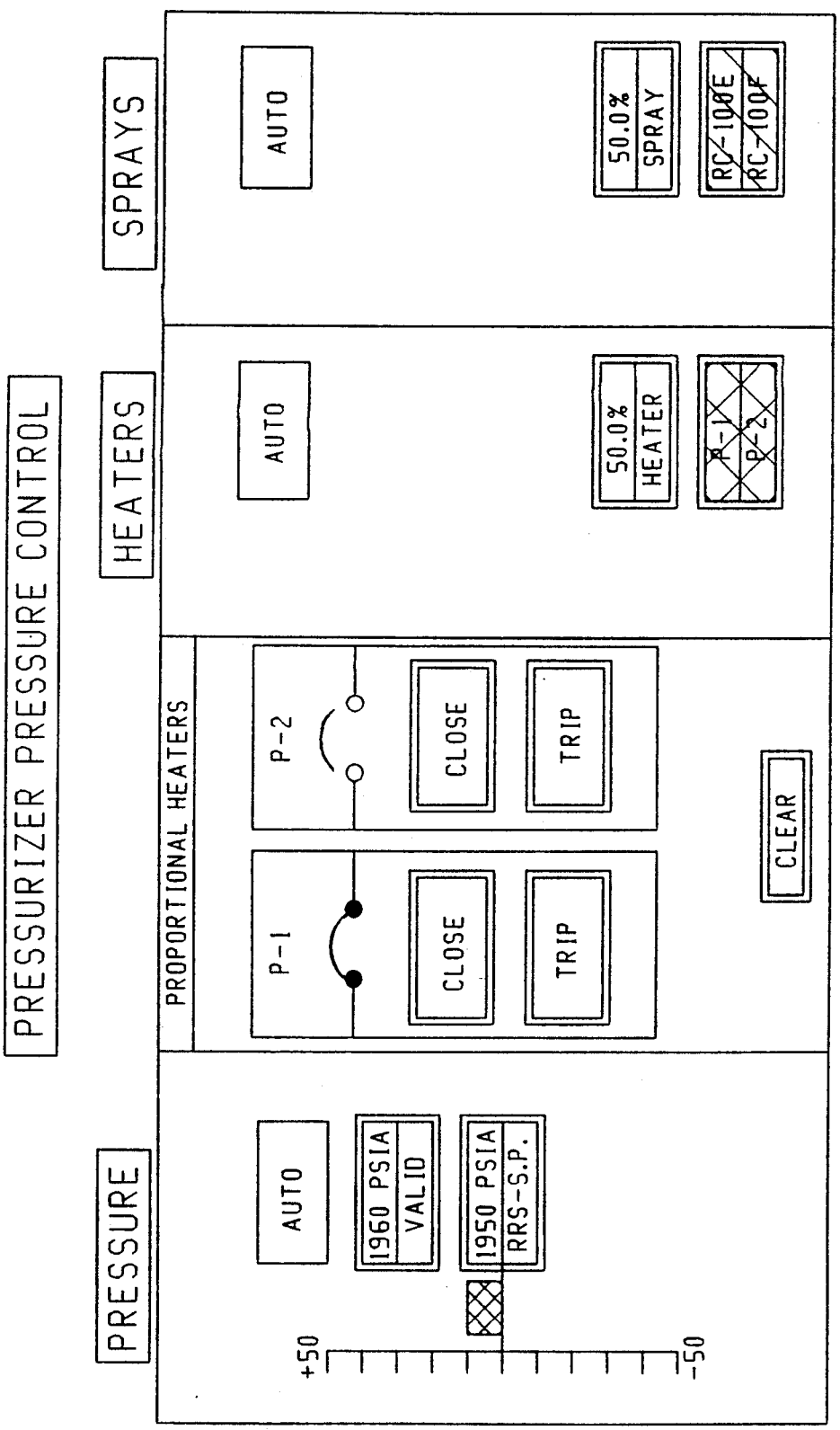
FIG. 19 depicts the device of FIG. 15, after the operator has paged through the dynamic image region to the image pattern that enables the operator to close or trip the proportional heaters.
Figure 20:
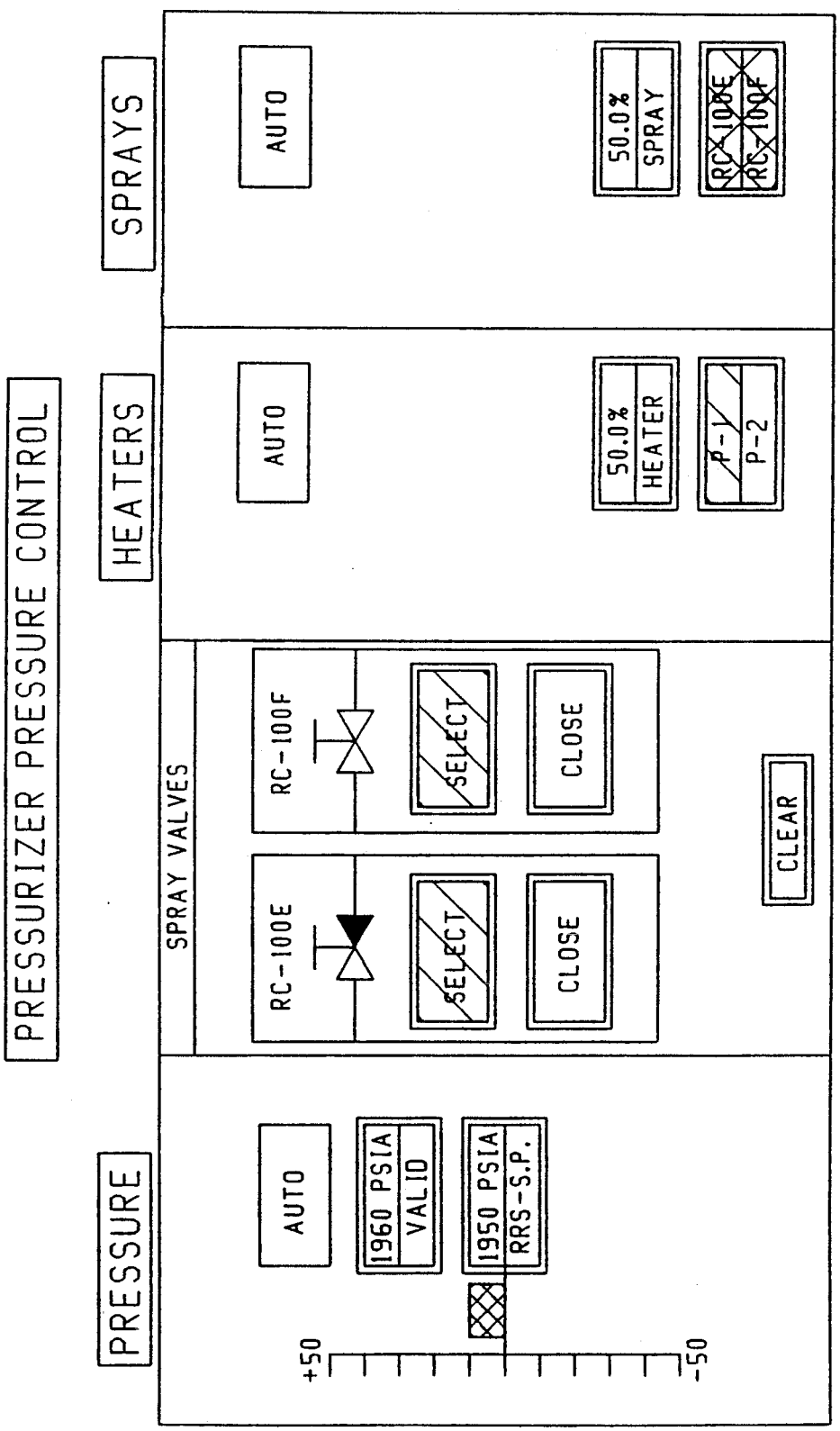
FIG. 20 depicts the device of FIG. 15, after the operator has paged through the dynamic image region to the image pattern that enables the operator to select (enable valve to be opened) or close one or both spray valves.

Those skilled in this art can understand from the foregoing description of various selection techniques, in conjunction with the other screen shots depicted in FIGS. 12-20, how the invention can be implemented for the control of other system parameters. For example, FIGS. 12-14 depict various conditions of the device 200 shown in FIG. 7, for operator specified settings of variables pertaining to the charging subgroup of section 204. FIGS. 15-20 depict a different device 400 for the process control of pressurizer pressure. FIG. 15 depicts an automatic mode control of pressurizer pressure, in a manner analogous to the pressurizer level control depicted in FIG. 8. FIG. 16 depicts the device 400 in a condition whereby the operator may observe in the fourth region that the pressurizer setpoint pressure has been specified by the reactor regulating system and that the device is in the automatic mode, but the operator has the option of pressing a target in the event the operator wishes to override the reactor regulating system and specify a new setpoint pressure. The master controller would then control the subgroups to achieve the operator setpoint on pressurizer pressure. FIG. 17 depicts the device in a condition whereby the heater subgroup may be adjusted, and FIGS. 18-20 depict device displays associated with the adjustment of the spray subgroup.

In a more general context, the process controller of the present invention provides various levels of control of a process operating parameter which varies in response to the state of at least two system components, each of which can adjust a different system variable. Tables 1-6 below show on a generic basis, the levels of control provided by the process controllers in accordance with the present invention. In these tables, it should be understood that the system parameter is the highest level of control provided by the process controller device, such as 200 and 400 depicted in FIGS. 7 and 14, respectively. Upon further inspection of each table vertically downward along the left, it may be seen that the system parameter can be under the control of either a plant-wide or similar controller, such as the reactor regulating system for specifying the setpoint of the parameter, or the setpoint parameter can selectively be specified by the operator through the touch targets appearing in the dynamic section 208 of FIG. 7.

The particular system parameter may be influenced by the operation of at least two subgroups, for example corresponding to sections 204 and 206 of FIG. 7, respectively. Through procedures explained above, the operator may, for each subgroup, permit the master control logic to specify the setpoint, or the operator may override the master control and specify a particular setpoint. The subgroup level of control is with respect to a particular variable, for example charging flow or letdown flow associated with FIG. 7. At least one of the subgroups may include a plurality of components such as shown for the second subgroup in the tables. Through selection techniques discussed with respect to the various figures, the operator may permit the setpoint for each component to be established by the logic associated with the master setpoint for the subgroup, or the operator may establish a setpoint or other component level operating condition.

Viewing the Tables 1-6 from left to right, an entry in the "selected" column indicates that, for the particular example shown in a particular table, the operator has selected the indicated condition, or the indicated condition occurs as a default upon the operator's selection of a related condition. The selections are made by the operator's touching one or more targets in the static and dynamic sections of the display device. The third, fourth, and fifth columns correspond to the status indicators such as 228, 230, and 232, respectively, depicted in FIG. 7. Each table thereby summarizes the relationship between how the parameter, subgroup, and component level setpoints have been established, and the indication to the operator of whether the process control is in automatic, semiautomatic, or manual mode.

Table 1 represents the most common operating situation, in which the system parameter setpoint is specified by a higher order controller, such as the reactor regulating system. The master control associated with the process controller device, automatically establishes the setpoints for the first and second subgroups, which in turn establish the setpoints for the individual subgroups of the components. The process parameter is deemed to be in automatic control, because the process controller parameter setpoint is controlled automatically by the higher order reactor regulating system control algorithm, and the master controller of the device automatically controls all aspects of the subgroups that influence the parameter.

Table 2 illustrates a first example of a semiauto mode of operation, whereby the operator has selected the setpoint for the system parameter, while permitting the master control algorithms to establish the setpoints for the variables that are responsive to all subgroups. Thus, the parameter is in semiauto using an operator established setpoint control, but the subgroups are in automatic.

Table 3 shows a second example of the semiauto mode of operation, wherein the operator has selected the setpoint for the system parameter, and has permitted the first and second subgroups to have their respective setpoint on the variables be specified by the master algorithm. The operator, however, has specified a particular setpoint on the second component of the second subgroup. Thus, the setpoints on the other components in the first and second subgroups will be specified by the master algorithm, which takes into account the operator specified setpoint on the second component of the second subgroup. The indicators for the example in Table 3, show that the system parameter is under manual control, and that the first subgroup is under the automatic control of the master, whereas the second subgroup has at least one setpoint thereunder, set manually by the operator.

Table 4 indicates a third example of a semiautomatic control of the process, whereby the system parameter setpoint is specified by the reactor regulating system, but the setpoint for the variable controlled by the first subgroup is specified by the operator. All the setpoints associated with the second subgroup remain under the master control, so that subgroup is deemed to be in the automatic mode.

Table 5 illustrates another semiautomatic example, wherein the setpoint for the system parameter is specified by the reactor regulating system, and the first subgroup is under the control of the master controller. The setpoint for the variable controlled by the second subgroup has been specified by the operator, and the operator has also specified the setpoint for the second component within the second subgroup. The first component within the second subgroup, remains within the control of the master setpoint.

Finally, the example shown in Table 6 indicates that the reactor regulating system establishes the process parameter setpoint, the first subgroup is under automatic control of the master algorithm, but that the operator has manually specified the setpoint for each of the components in the second subgroup. This has the de facto effect of eliminating any influence of the master control on the second subgroup.

TABLE 1

| | | AUTOMATIC EXAMPLE 1 | | |
| | | | Status Indicator Window | |
| | | Selected | Parameter | Sub-group | Sub-group |
|---|---|---|---|---|---|
| I. | System Parameter | | Auto | | |
| | RRS Setpoint | X | | | |
| | Operator S.P. | | | | |
| A. | First Subgroup | | | Auto | |
| | Master S.P. | X | | | |
| | Operator S.P. | | | | |
| B. | Second Subgroup | | | | Auto |
| | Master S.P. | X | | | |
| | Operator S.P. | | | | |
| 1. | First Component | | | | |

TABLE 1-continued
AUTOMATIC EXAMPLE 1

| | Selected | Status Indicator Window Parameter | Sub-group | Sub-group |
|---|---|---|---|---|
| Master S.P. | X | | | |
| Operator S.P. | | | | |
| 2. Second Component | | | | |
| Master S.P. | X | | | |
| Operator S.P. | | | | |

TABLE 2
SEMIAUTOMATIC EXAMPLE 1

| | Selected | Parameter | Sub-group | Sub-group |
|---|---|---|---|---|
| I. System Parameter | | Semiauto | | |
| RRS Setpoint | | | | |
| Operator S.P. | X | | | |
| A. First Subgroup | | | Auto | |
| Master S.P. | X | | | |
| Operator S.P. | | | | |
| B. Second Subgroup | | | | Auto |
| Master S.P. | X | | | |
| Operator S.P. | | | | |
| 1. First Component | | | | |
| Master S.P. | X | | | |
| Operator S.P. | | | | |
| 2. Second Component | | | | |
| Master S.P. | X | | | |
| Operator S.P. | | | | |

TABLE 3
SEMIAUTO EXAMPLE 2

| | Selected | Parameter | Sub-group | Sub-group |
|---|---|---|---|---|
| I. System Parameter | | Semiauto | | |
| RRS Setpoint | | | | |
| Operator S.P. | X | | | |
| A. First Subgroup | | | Auto | |
| Master S.P. | X | | | |
| Operator S.P. | | | | |
| B. Second Subgroup | | | | Manual |
| Master S.P. | X | | | |
| Operator S.P. | | | | |
| 1. First Component | | | | |
| Master S.P. | X | | | |
| Operator S.P. | | | | |
| 2. Second Component | | | | |
| Master S.P. | | | | |
| Operator S.P. | X | | | |

TABLE 4
SEMIAUTO EXAMPLE 3

| | Selected | Parameter | Sub-group | Sub-group |
|---|---|---|---|---|
| I. System Parameter | | Semiauto | | |
| RRS Setpoint | X | | | |
| Operator S.P. | | | | |
| A. First Subgroup | | | Manual | |
| Master S.P. | | | | |
| Operator S.P. | X | | | |
| B. Second Subgroup | | | | Auto |
| Master S.P. | X | | | |
| Operator S.P. | | | | |
| 1. First Component | | | | |
| Master S.P. | X | | | |
| Operator S.P. | | | | |
| 2. Second Component | | | | |
| Master S.P. | X | | | |

TABLE 4-continued
SEMIAUTO EXAMPLE 3

| | Selected | Parameter | Sub-group | Sub-group |
|---|---|---|---|---|
| Operator S.P. | | | | |

TABLE 5
SEMIAUTO EXAMPLE 4

| | Selected | Parameter | Sub-group | Sub-group |
|---|---|---|---|---|
| I. System Parameter | | Semiauto | | |
| RRS Setpoint | X | | | |
| Operator S.P. | | | | |
| A. First Subgroup | | | Auto | |
| Master S.P. | X | | | |
| Operator S.P. | | | | |
| B. Second Subgroup | | | | Manual |
| Master S.P. | | | | |
| Operator S.P. | X | | | |
| 1. First Component | | | | |
| Master S.P. | X | | | |
| Operator S.P. | | | | |
| 2. Second Component | | | | |
| Master S.P. | | | | |
| Operator S.P. | X | | | |

TABLE 6
SEMIAUTO EXAMPLE 5

| | Selected | Parameter | Sub-group | Sub-group |
|---|---|---|---|---|
| I. System Parameter | | Semiauto | | |
| RRS Setpoint | X | | | |
| Operator S.P. | | | | |
| A. First Subgroup | | | Auto | |
| Master S.P. | X | | | |
| Operator S.P. | | | | |
| B. Second Subgroup | | | | Manual |
| Master S.P. | | | | |
| Operator S.P. | X | | | |
| 1. First Component | | | | |
| Master S.P. | | | | |
| Operator S.P. | X | | | |
| 2. Second Component | | | | |
| Master S.P. | | | | |
| Operator S.P. | X | | | |

The selection examples described above are similar for other selectable process controller functions. In addition to Pressurizer Level and Pressure Control, other process controllers would also be provided in a nuclear power plant. The following is only a partial list of other such process controllers:

RCP Seal Injection Controller
Makeup Controller
Main Steam Pressure Controller
Steam Generator-1 Level Controller
Steam Generator-2 Level Controller
Feedwater Pump Speed Controller
Atmospheric Dump Valve Control-Division A
Atmospheric Dump Valve Control-Division B
HVAC
Component Cooling Water
Turbine Auxiliaries One operator module for each CCS division is included in the control room and on the RSP to provide independent backup to control switches and process controllers. The operator module acquires and transmits monitoring and control data through the DAM. In a manner similar to the process control displays, operator module software includes static display page coding and dynamic display driver software. Operator module design is based on the programmable electroluminescent display technology with touch sensitive screen. Process controllers interface with related CCS subgroup segments through coprocessors and datalinks. Each process controller is assigned to redundant coprocessor modules that are identically programmed to perform the specific control functions associated with the process controller.

(f) Software and Logic Distribution

Figure 4:
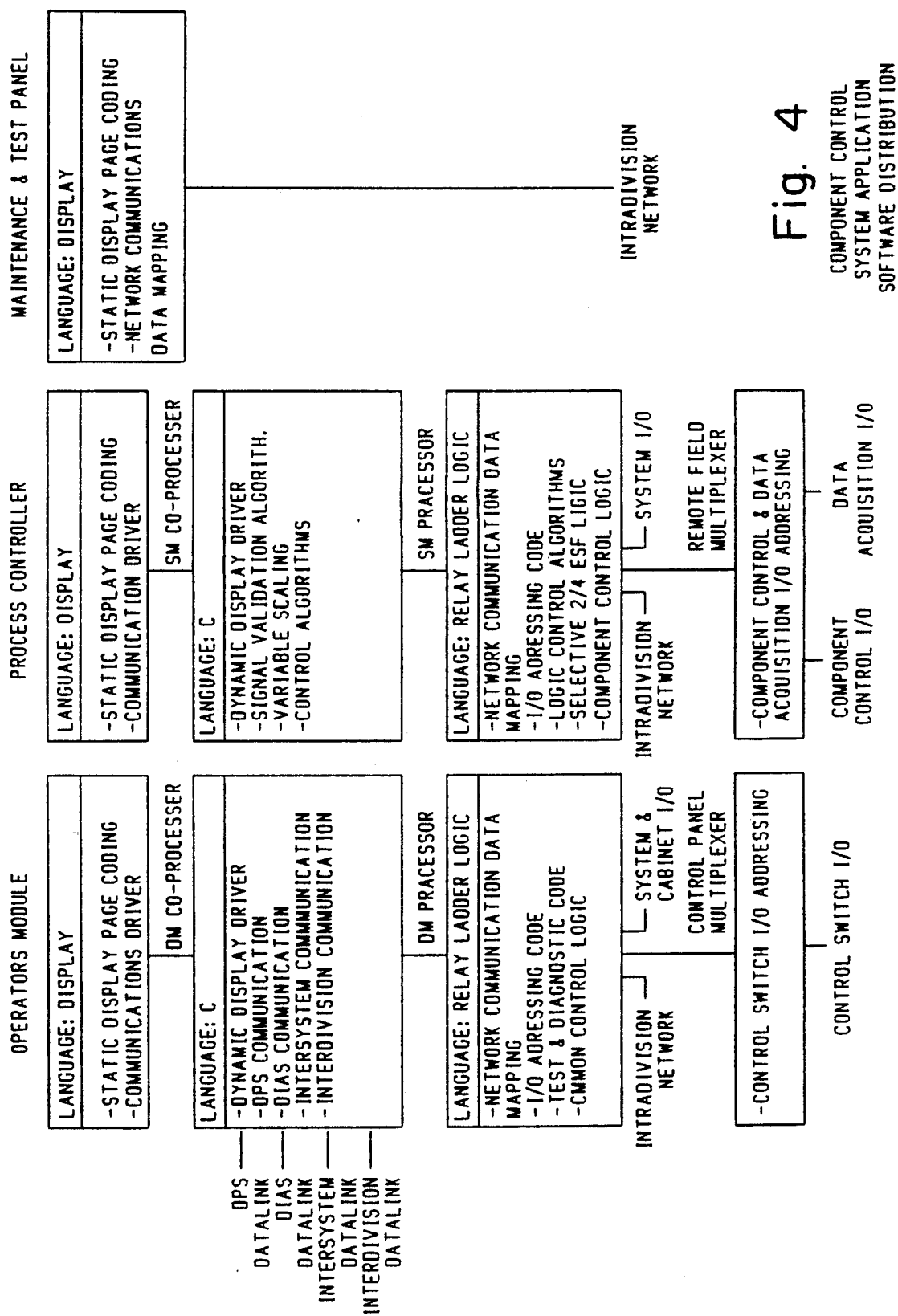
FIG. 4 shows one possible application software distribution for implementing the present invention in the component system shown in FIGS. 2 and 3.

Process controller software consists of static display page coding and dynamic display driver software. Display page software is programmed in the DISPLAY language and resides in protected memory in the process controller as shown in FIG. 4. The display devices are preferably implemented using an electroluminescent display panel, power conversion circuitry, and graphics drawing controller with VT, such as the M3 electroluminescent display module available from the Digital Electronics Corporation, Hayward, California. The control function is preferably implemented using discrete, distributed programmable controllers of the type available under the trademark "MODICON 984" from the AEG Modicon Corporation, North Andover, Mass. Dynamic display driver software is programmed in C in the coprocessor and controls the periodic transfer (or on-demand transfer) of dynamic data from the coprocessor to the display. This design approach is taken to reduce the amount of data on the datalink for optimization of display response. The process controller facilitates both supervisory (master loop) control and individual (subloop) control and monitoring of process control functions. Each process controller is dedicated to only its process control function.

Software is classified into two major categories; operating system software and application software. Operating system software consists of the processor operating system, I/O handling, communications handling and equipment self-test software Application software is the implementation-specific code that is developed during the CCS design process.

Operating system software code resides in fixed read only memory (ROM) within CCS processors. This code is written by the PLC manufacturer and offered as a standard off-the-shelf products. Qualification is accomplished by a combination of a) validation through extensive testing for the intended application and b) successful operating history in similar applications. After qualification testing, stringent configuration controls are maintained for the operating system software. Application software code resides in battery-backed nonvolatile random access memory (RAM) in CCS processors. This code is written during the CCS design process in PLC relay ladder logic (RLL) language and in high level C or basic.

Component control logic (CCL) is performed by the Subgroup Master Controller (SMC). This is the component level logic that monitors the various digital inputs such as manual on-off demands, interlocks and automatic subgroup control signals and produces typical digital output signals to control the component (i.e., START/STOP, ON/OFF) through power level interface devices. This logic also generates digital outputs for status indication (i.e., ON/OFF, OPEN/CLOSE indicating lights). The SMC is also where the relay ladder logic for control of the component resides.

Plant components that are controlled by the CCS have traditionally been controlled using dedicated circuits for each component. Review of plant components and the process systems in which they reside shows that a majority of components do not process a unique-functional identity since they are not individually important/vital to the plant but are collectively important as part of a subsystem or group.

Looking at a simplistic system model, the valves in a fluid flow path are of little importance without the pump that drives the fluid. Conversely, the pump is of no value if the valves in a fluid flow path cannot be positioned to establish flow. This fundamental observation is the basis for CCS system configuration.

The CCS configuration is based on an architecture which provides multiple subgroup segments within a CCS division. Each subgroup segment is functionally independent from every other subgroup segment in a division. Functionally unrelated plant systems are assigned to different subgroup segments in a division to maintain the level of functional independence present in the plant systems.

Within a subgroup segment, functionally dependent plant components are assigned to a common RFM. In a given subgroup segment, numerous RFM's allow the independence that exists within the mechanical system to be duplicated in the CCS. Therefore, where flow path independence exists in a plant mechanical system, that same independence is achieved through separate RFM assignment in a CCS subgroup segment. Where component redundancy exists within a mechanical system, that redundancy is maintained by assignment to separate RFM's. Each RFM is independent of every other RFM such that failures do not propagate among RFM's in a subgroup segment.

RFM independence is also maintained through correlation of independent power bus assignments. For example, independent and or redundant-components controlled by the Process-CCS are powered from independent (X or Y) power buses. These components are assigned to independent RFM's in a subgroup segment which are also powered from the same independent (X or Y) power buses. Thus component independence and redundancy is maintained.

Comparing the CCS functional group control to traditional component control designs which use dedicated logic circuits for each plant component, it is evident that the CCS does not achieve the same degree of independence for each component. However, individual independence is of no value in a process system where the components are dependent upon each other. The CCS design achieves the same level of independence as in the process system itself. This level of independence is adequate; anything more is of no benefit and in fact can be detrimental to system-level reliability.

For example, a process system with twelve interdependent components is controlled in the present CCS design by one microprocessor. In the traditional designs this same process system would be controlled by 12 microprocessors. In the present CCS, a failure of the one microprocessor would render this system inoperable. In the traditional design, a failure of any one of the 12 processors would render the system inoperable since all components are needed for system operation.

Another benefit of the CCS functional group configuration can be seen in failure modes and effects analysis.

Since components are assigned to CCS functional groups in a manner consistent with their process relationship, the effects of failures are predictable and manageable. Traditional CCS designs utilize dedicated processors for each component but that component independence is compromised through sharing of power supplies, auxiliary logic modules and auxiliary I/O cards. Failures in shared devices can affect a large number of unrelated plant components, requiring difficult failure modes analysis often with unacceptable results. The present CCS functional group design achieves the functional circuit independence.

Where control and protection systems have identical sensor input requirements, redundant Class 1E sensors that are used independently by each channel of the protection system may, in selected cases, also be used by the Process-CCS. For each sensed parameter, the Process-CCS monitors all four redundant instrument channels via analog fiberoptic interfaces to ensure electrical independence. This signal validation logic is used to detect bypassed or failed sensors, thereby ensuring that they cause no erroneous control actions and to select the sensed value to be used in the control algorithm.

The validation logic design ensures that with a PPS sensor or channel in bypass, another sensor can fail with no resulting Process-CCS action. Therefore with one channel in bypass the protection system remains in an effective two-out-of-three configuration, meeting the required single failure criteria.

Signal validation algorithms are programmed in "C" and reside in Process-CCS SMC coprocessors as shown in FIG. 4. The preferred signal validation logic functions as follows. All "good" sensors are averaged ("good" is explained below). Each sensor is then deviation-checked against the average to verify that the average was calculated using only sensors that have not drifted or failed. Sensors that show acceptable deviations are considered "good". Sensors with unacceptable deviations are considered "suspect". If the average was calculated with "suspect" sensors, the most deviating sensor is eliminated, then the foregoing steps are repeated. An average calculated with only "good" sensors is considered valid and is then used as the controlling signal within the Process-CSS. "Suspect" sensors are now declared "bad". "Bad" sensors are automatically declared "good" when they show an acceptable deviation from the previously determined valid signal.

The algorithm eliminates deviating sensors under all failure conditions. However, the validation algorithms will be unable to determine a valid signal for control under two conditions. If successive failures have occurred over time (without intervening repair), thereby leaving less than two "good" sensors available, or if two sensors are declared "suspect within the same execution cycle of the algorithm. If this occurs, it is assumed that two sensors have failed simultaneously (even though this is an unlikely event). With two simultaneous failures a valid signal cannot be determined. In either case the Process-CCS control function continues to control based on the last valid signal, with all control outputs remaining unchanged and a signal is generated for a DIAS and DPS alarm.

While in the "last valid mode", the algorithm continues to attempt to obtain a valid control signal. If a valid signal is determined operation will be resumed automatically. At any time, the operator can select a particular sensor to be used in automatic control. Administrative procedures ensure that if a protection channel is in bypass, the only sensor selected is within the bypassed or tripped channel if that sensor is operable. If the sensor from the bypassed or tripped channel is not operable, the Process-CCS must be left to control based on the last valid signal, or placed in manual. This will avoid adverse control/protection interaction if a subsequent failure should occur in the selected channel. It is noted that once a sensor is selected by the operator, that sensor is used by the validation algorithm to automatically return "bad" sensors to "good". A "good" sensor is declared when its deviation check against the selected sensor is acceptable. If the operator has selected a sensor for control, that sensor will remain selected continuously. If the algorithm can determine a valid control signal, a status signal will be generated to inform the operator that he can reselect the validated signal for control.

As shown in FIG. 4 use of the SM coprocessor for continuous process control provides a "tightly" coupled control architecture since control algorithms, related signal validation, variable scaling and process controller display control functions are all performed by the same coprocessor for each process control function. Typical process control functions include P, PI, PID, lag, lead/lag ... etc. Because "C" is utilized as the programming language, standard and customized process control algorithms are easily supported.

(g) "Up" and "Down" Touch Targets

In the preferred embodiment, the man-machine interface is further improved by providing automatic variation in the increments and decrements, and automatic overshoot protection, with respect to the "up" and "down" touch targets such as 274 and 276 shown in FIG. 9. These targets have three effective positions, "neutral", "increase" and "decrease", whether embodied in one or a plurality of switches. Moreover, the improvements can be implemented in virtually any digital controller device.

As the operator increases or decreases a selected value of, for example, a setpoint or component output, the originally displayed value is incremented or decremented at a first rate of, for example, one digit at a time. After a predetermined number of value changes, for example five, or after a first time interval while the switch is held in the increment or decrement position, the value is then incremented or decremented in larger units of, for example, five or ten digits. The amount that the value jumps will depend on the range of scale. After approximately five more value changes, the value is incremented or decremented in even larger jumps of ten or fifty. Again the amount that the value jumps will depend on the chosen range of scale. As the value approaches either the top or bottom scale end, the increment changes should be "slowed down" to first either changes of five or ten digits, and then changes of one digit until end of scale is approached. As a last rule of change, the values should first reach some multiple of the value of increment before the larger increment change is implemented. An example is shown immediately below.

---

62, 63, 64, 65, 66, 67, 68, 69, 70 = SMALL CHANGE
(one digit change)
80, 90, 100, 110, 120, 130, 140 = LARGER CHANGE
(10 digit change)
150, 200, 250, 300 = LARGEST CHANGE -continued (50 digit change)

Figure 21:
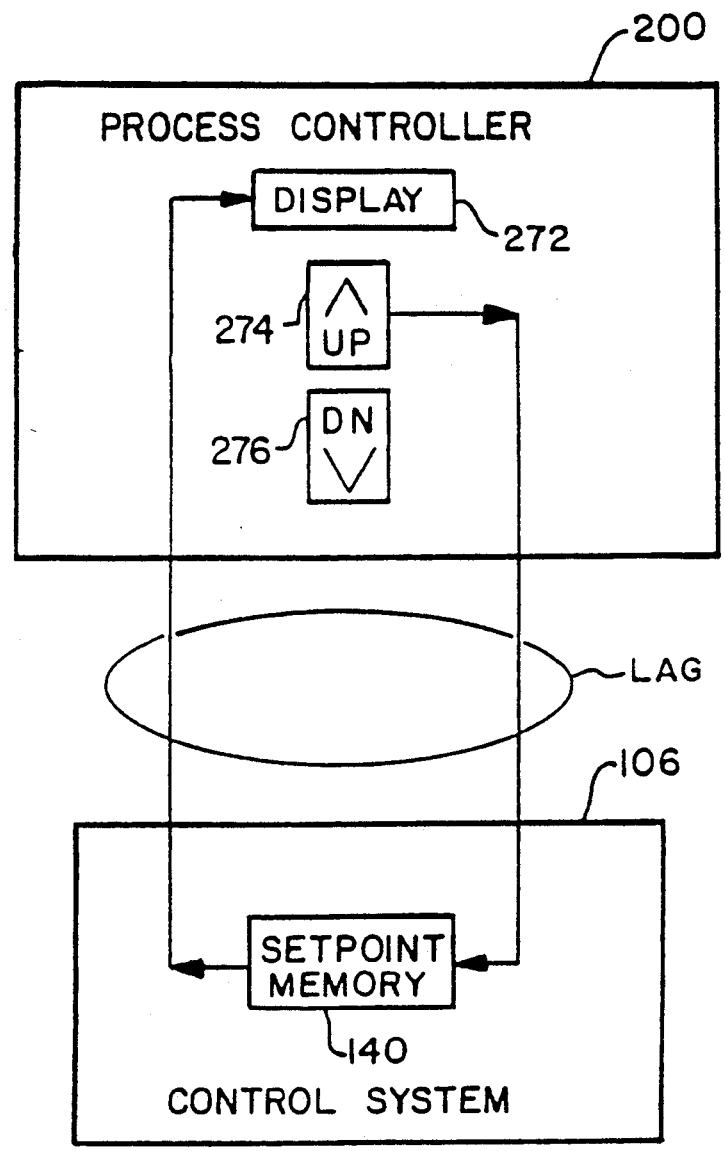
FIG. 21 is a schematic representation of the conventional way in which the action by the operator to change a dynamic value such as a setpoint, is delayed before display to the operator on the process controller device.

The other improvement prevents overshoot during manual interaction. Overshoot is typically caused by propagation delays between computers. This is shown schematically in FIGS. 2, 9 and 21. When the operator touches the "up" target 274 on the process controller device 200, the setpoint memory 140 in the control system 106 is updated. The control system then sends this updated setpoint to the display 272 on the process controller 200. This transmission to a control system computer and back to the process controller results in the display value at 272 lagging behind the operator's touch on the touch target 274. In some systems, the display may continue changing for one or two seconds after the operator removes his or her finger from the touch target, thereby creating confusion and frustration.

Figure 22:
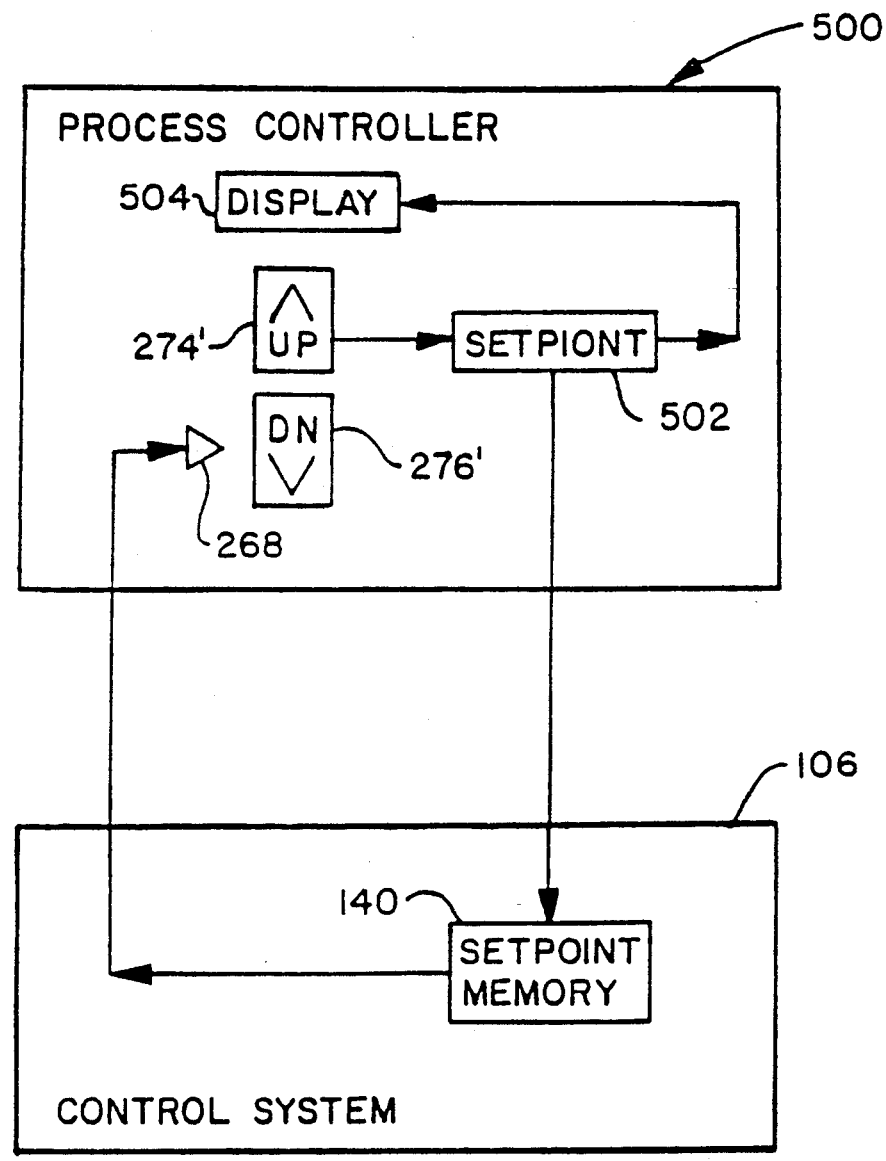
FIG. 22 is a schematic of a feature of the present invention, by which the change in setpoint is displayed to the operator on the controller device without the delay associated with the signal paths of FIG. 21.

As shown in FIG. 22, the improved setpoint control prevents this overshoot during manual interaction. The operator touches a touch target 274',276' on the process controller 500, which first updates the setpoint stored at 502 within the process controller and then updates the display 504. This internal updating of the setpoint is very fast and the lag is perceptually invisible to the operator. After the operator removes his or her finger from the touch target 274', the setpoint signal is sent to the setpoint memory 140 in the control system 106. The control system then processes this updated setpoint and makes required system adjustments. To inform the operator that the control system has responded, a signal is sent by the control system 106 to the arrow 268' on the process controller, moving it to a new position which is equivalent to the digital display 404 on the process controller.

We claim:

1. In a process plant having a system in which a process operating parameter varies in response to the state of at least two system components each of which can adjust a different system variable, and a process controller including a computer driven interactive graphics display device coupled to the system such that for a setpoint value of the process operating parameter the components can automatically adjust at least one variable to achieve the process operating parameter setpoint, wherein the improved process controller comprises:

a first region on the display device, for generating images of a first meter, said process operating parameter setpoint, and the value of the process operating parameter;

a second region on the display device, for generating images of a second meter and the value of a first one of said system variables;

a third region on the display device, for generating images of a third meter and the value of a second one of said system variables;

means on the display device, for generating an image of an interactive mode control target which can activate either of at least two system master control modes including, automatic, such that for a non-operator specified setpoint value of the process operating parameter, any one or more of the components can automatically adjust at least one of said first and second variables to achieve the process operating parameter setpoint, and semiautomatic, such that for a non-operator specified setpoint value of the process operating parameter, any one or more but less than of all the components can automatically adjust a respective at least one of said first and second variables to achieve the process parameter setpoint;

a fourth region on the display device, for selectively generating either of two distinct, interactive component control target images, wherein, one of the component control target images includes means for manually adjusting said first variable, and the other of the component control target images includes mans for manually adjusting said second variable, whereby the process controller can be operated in said semiautomatic mode.

2. The process controller of claim 1, wherein each of the component control target images includes means for establishing a setpoint value for the variable.

3. The process controller of claim 1, wherein each of the component control target includes means for establishing a demand signal for the variable.

4. The process controller of claim 1, wherein, each of the component control target images can have at least two forms, one form including means for establishing a setpoint value for the variable and another for establishing a demand signal for the variable, and the process controller includes means for selecting any one of the target images and forms in the fourth image region.

5. The process controller of claim 1, wherein said first region includes means for indicating the activated system control mode, said second region includes means for indicating whether said one variable is under one of automatic or manual adjustment control, and said third region includes means for indicating whether the other variable is under one of automatic or manual adjustment control.

6. The process controller of claim 1, wherein said second region includes means for identifying each component that can adjust said one variable, and said third region includes means for identifying each component that can adjust said other variable.

7. The process controller of claim 1, wherein the first, second and third regions each has a plurality of static display fields in which the respective field shape and information content are dedicated, and the process controller includes means for generating and displaying in the fourth region, any one of an operator-selectable plurality of control array views that include said component control target images, each view having a plurality of static display fields in which the field shape and information content are dedicated.

8. The process controller of claim 7, wherein at least two of said views are associated with each variable, one of said associated views including an interactive image of means for adjusting a setpoint value for the associated variable and the other associated view including an interactive image of means for establishing a specific condition for at least one component that influences the variable.

9. The process controller of claim 1, wherein each of the first, and the second and third, regions includes means for displaying a bargraph representation of the setpoint deviation of the process parameter and said variables, respectively.

10. The process controller of claim 1, wherein when said mode control target activates the semiautomatic mode the operator can specify the process operating parameter and any one or more, including all, of the components can automatically adjust at least one of said variables to achieve the process operating parameter setpoint.

11. The process controller of claim 10, wherein the mode control target can activate a manual mode of system control in which the automatic and semiautomatic system master control modes are inoperative when the operator manually adjusts in said fourth region, all of the system variables.

12. A process controller for a system including a vessel containing liquid, a charging subsystem for adding liquid to the vessel, and a letdown subsystem for removing liquid from the vessel, comprising:
   an operator interface having four visually distinct, substantially contiguous regions,
      the first region being dedicated to monitoring the level of liquid in the vessel,
      the second region being dedicated to monitoring the charging subsystem,
      the third region being dedicated to monitoring the letdown subsystem, and
      the fourth region being dedicated to the specification of a setpoint for each of said subsystems;
   signal transmission means for communicating digitized data between the system and the interface;
   control logic means coupled to the first signal transmission means, for defining at least three system master control logic schemes including,
      a first control logic, whereby both subsystems are automatically controlled to achieve a liquid level setpoint specified by the system,
      a second control logic, whereby the operator specifies a setpoint on the operation of one subsystem and the other subsystem is automatically controlled to achieve a liquid level setpoint specified by either the system or the operator, and
      a third control logic, whereby the operator specifies the level setpoint and at least one of the subsystems adjusts automatically to achieve the level setpoint.

13. The controller of claim 12, wherein the fourth region includes means for specifying the flow setpoint for the charging subsystem, means for specifying the flow demand of the charging subsystem, means for specifying the flow setpoint of the letdown subsystem, and means for specifying the flow demand of the letdown subsystem.

14. The controller of claim 13, wherein the fourth region is a display area on a computer generated display screen, and the controller includes selection means for changing the display in the fourth region to any one of said means for specifying.

15. The process controller of claim 12, wherein the control logic means includes a manual logic scheme in which each of the subsystems can be manually adjusted without being subject to automatic control.

16. A touch sensitive electro-luminescent display device for controlling a process dependent parameter in either automatic, semiautomatic or manual modes, wherein the device has a display screen substrate and means for generating images superimposed on the substrate, and the process is performed by at least two subsystems each of which has at least one component capable of adjusting a process independent variable, the device comprising:
   first, second and third substrate regions each having a respective plurality of superimposed static indicator and switch images thereon;
   a fourth substrate region that can be selectively activated to dynamically superimpose each of a plurality of indicator and switch images thereon;
   said superimposed images on the first substrate region including indicators of the current value of the parameter, the current setpoint for the parameter, and the current mode of control for the process;
   said superimposed images on the second region including,
      indicators of the current value of one of said variables, the current setpoint value for said one variable, the identification of the components capable of adjusting said one variable, and the current mode of operation of the components capable of adjusting said one variable, and
      a switch for dynamically selecting one of at least three first subsystem control image patterns in the fourth region, including touch sensitive images for opening or closing at least one of the components, adjusting the output demand of at least one of the components, and establishing an operator setpoint for the one variable;
   said superimposed images on the third region including,
      indicators of a bargraph representation of process deviation from setpoint, the current value of the other of said variables, the current setpoint value for said other variable, the identification of the components capable of adjusting said other variable, and the current mode of operation of the components capable of adjusting said other variable, and
      a switch for dynamically selecting one of at least three second subsystem image patterns in the fourth region, including opening or closing one or ore of the components, adjusting the output demand of one or more of the components, and establishing an operator override setpoint for the one variable.

17. The display device of claim 16, wherein the first region includes a superimposed switch image for activating an image pattern in the fourth region, which includes means for adjusting the parameter setpoint.

18. The display device of claim 16, wherein the first region includes a bargraph representation of the deviation of the process parameter value from the process parameter setpoint.

19. The display device of claim 18 wherein the indicators in the second and third regions include bargraph representations of the deviation of the value of the respective variable from setpoint for the respective variable.

20. A controller device by which an operator can adjust an operating variable in a process plant system from a plant control room, comprising:
   first means, included within the plant system, for storing a target value of the variable;
   second means responsive to the current and target values of the variable, for altering the variable toward the target value;

third means, in the control room, for displaying the current value of the variable;

fourth means, in the control room, for displaying the target value of the variable;

fifth means, in the control room, for manually generating a first signal commensurate with a desired change in the target value of the variable; and sixth means, coupled to the first, fourth and fifth means, for receiving said first signal from the fifth means and sending second and third signals to the first and fourth means, respectively, commensurate with the desired change in the target value of the variable.

21. The controller device of claim 20, wherein the operating variable is the setpoint of a fluid property of the plant system.

22. The controller device of claim 21, wherein the fluid property is one of the group of properties consisting of flow rate, temperature, pressure, and level.

23. The controller device of claim 20, wherein
the fifth means is a switch; and
the sixth means sends the second signal to the first means while the switch is activated and sends the third signal to the fourth means when the switch is deactivated.

24. A method for incrementing and decrementing the target value of a plant operating variable from the value currently displayed to the operator in the plant control room, comprising:

(a) providing a switch means having three manually selectable settings consisting of neutral increment, and decrement;

(b) setting the switch means to neutral when the current value of the variable is to be maintained;

(c) setting the switch means to the increment position when the value of the variable is to be increased;

(d) while the switch is in the increment position,
   (i) increasing the target value of the variable by a first time rate of unit change for a first predetermined total increment, then
   (ii) increasing the target value by a second, higher time rate of unit change for a second predetermined total increment following the first total increment, followed by
   (iii) resetting the switch to the neutral position.

25. The method of claim 24, wherein the value of the variable is displayed to the operator on a meter having a finite scale with upper and lower limits, and wherein the method includes the step between steps (d)(ii) and (d)(iii), of increasing the target value of the variable by a third time rate of unit change which is less than the second rate as the target value approaches the upper limit.

26. The method of claim 24 wherein the range of the scale of the meter displayed to the operator can be varied, and wherein the magnitude of at least the second rate of unit change is dependent on the range of the displayed scale.

* * * * *